United States Patent
Amtoft

(10) Patent No.: US 12,516,997 B2
(45) Date of Patent: Jan. 6, 2026

(54) STATIC WHEEL BALANCER

(71) Applicant: Torben Amtoft, Støvring (DK)

(72) Inventor: Torben Amtoft, Støvring (DK)

(73) Assignee: Torben Amtoft, Støvring (DK)

( * ) Notice: Subject to any disclaimer, the term of this patent is extended or adjusted under 35 U.S.C. 154(b) by 539 days.

(21) Appl. No.: 18/001,850

(22) PCT Filed: Jul. 17, 2020

(86) PCT No.: PCT/DK2020/000228
§ 371 (c)(1),
(2) Date: Dec. 14, 2022

(87) PCT Pub. No.: WO2022/012723
PCT Pub. Date: Jan. 20, 2022

(65) Prior Publication Data
US 2023/0228642 A1    Jul. 20, 2023

(51) Int. Cl.
*G01M 1/12* (2006.01)
*G01M 1/32* (2006.01)

(52) U.S. Cl.
CPC .............. *G01M 1/12* (2013.01); *G01M 1/326* (2013.01)

(58) Field of Classification Search
CPC ................................ G01M 1/12; G01M 1/326
See application file for complete search history.

(56) References Cited

U.S. PATENT DOCUMENTS

| | | | | |
|---|---|---|---|---|
| 5,195,370 A | * | 3/1993 | Hultberg | G01M 1/045 73/462 |
| 7,882,739 B1 | * | 2/2011 | Truex | G01M 1/326 73/460 |

(Continued)

FOREIGN PATENT DOCUMENTS

| | | | |
|---|---|---|---|
| JP | 11160183 A | * | 6/1999 |
| JP | 2007033038 A | * | 2/2007 |

OTHER PUBLICATIONS

International Search Report and Written Opinion mailed Jun. 8, 2021 in International Application No. PCT/DK2020/000228, 17 pages.

*Primary Examiner* — Jamel E Williams
(74) *Attorney, Agent, or Firm* — Lee & Hayes, P.C.

(57) ABSTRACT

The invention relates to a static wheel balancer (SWB); comprising a wheel carrier (WC); wherein the wheel carrier includes at least two wheel support elements (WSE); wherein the wheel support elements (WSE) supports and establish a reference for a selected edge of a wheel when the wheel is positioned in the wheel carrier, wherein the wheel support elements (WSE) defines a wheel positioning plane (WPP); and the static wheel balancer further comprising a weight measuring arrangement (WMA) including at least one load cell (EC); wherein a weight measuring point (WMP) of the load cell (EC) is arranged to measure a partial weight of the wheel (WH) at a selected wheel edge (WE) at a given angular orientation (AO) of the wheel (WH); and wherein the weight measuring point (WMP) is arranged at a predetermined distance (PD) to at least one of the at least two-wheel support elements (WSE); and wherein the weight measuring point (WMP) forms part of one of the at least two wheel support elements (WSE); and the static wheel balancer further including a display (DP) arranged to display a measure of imbalance obtained based on partial measured weight at the weight measuring point (WMP).

11 Claims, 9 Drawing Sheets

(56) References Cited

U.S. PATENT DOCUMENTS

2003/0041666 A1\* 3/2003 Parker ................. G01M 17/022
                                                      73/462
2005/0145028 A1\* 7/2005 Gerdes ................... G01M 1/02
                                                     73/462

\* cited by examiner

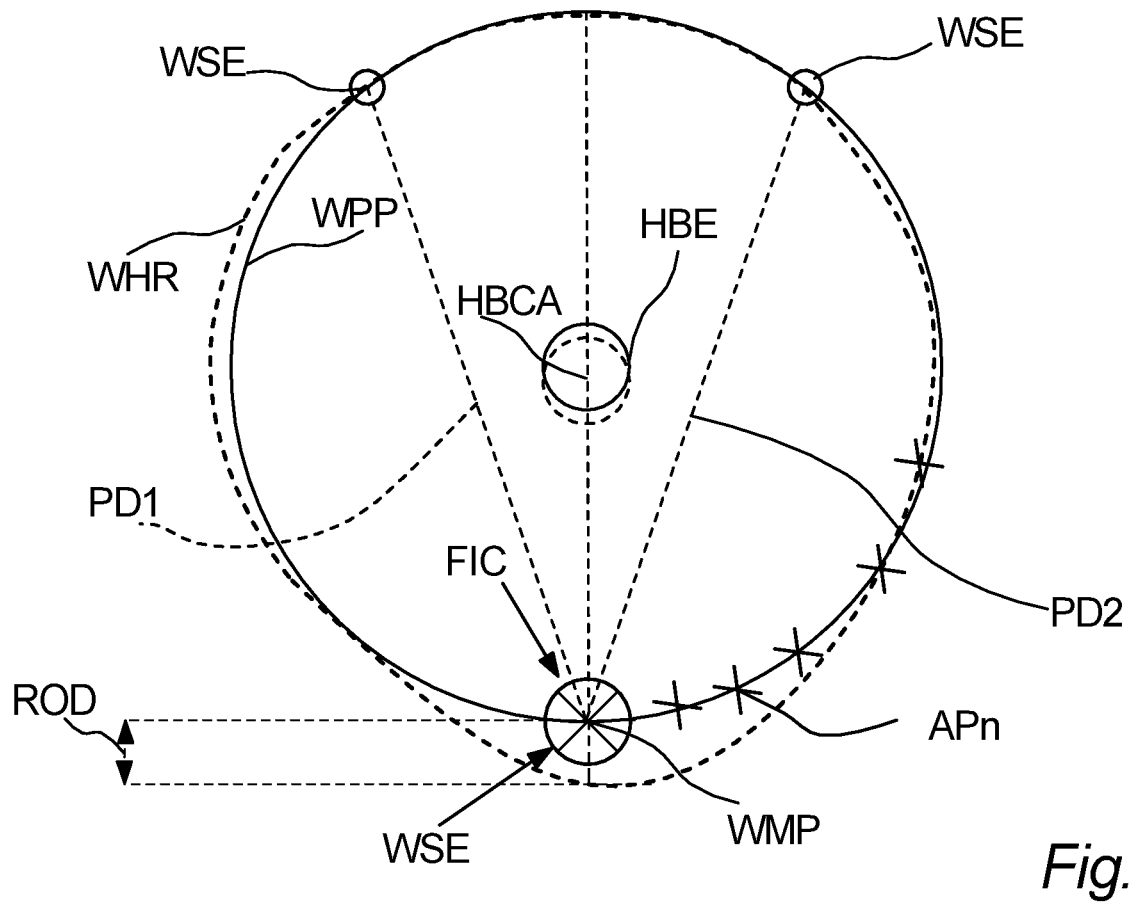
*Fig. 4*
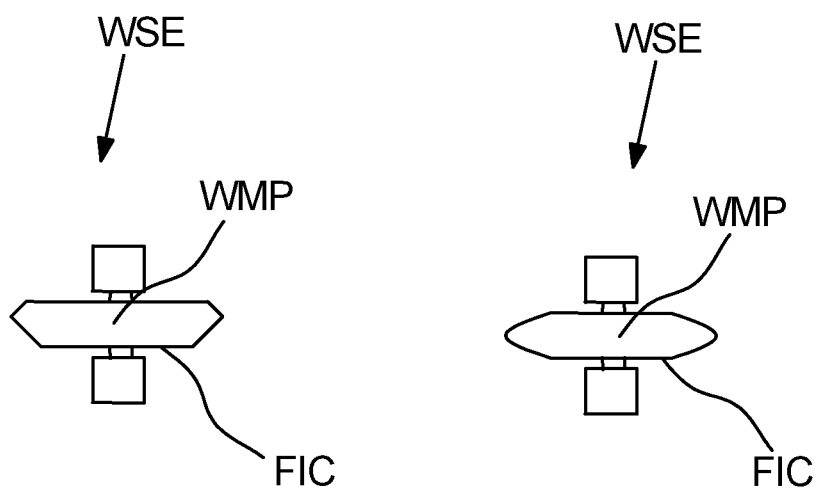
*Fig. 4a*  *Fig. 4b*

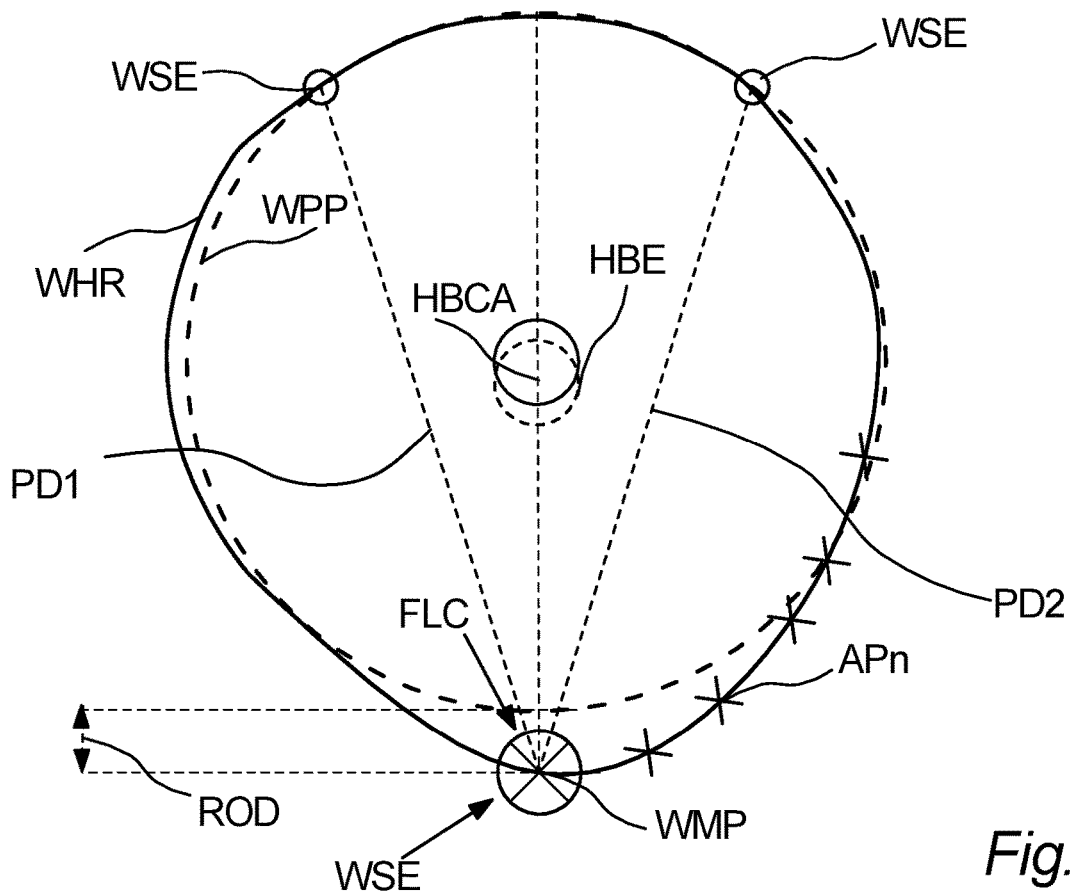
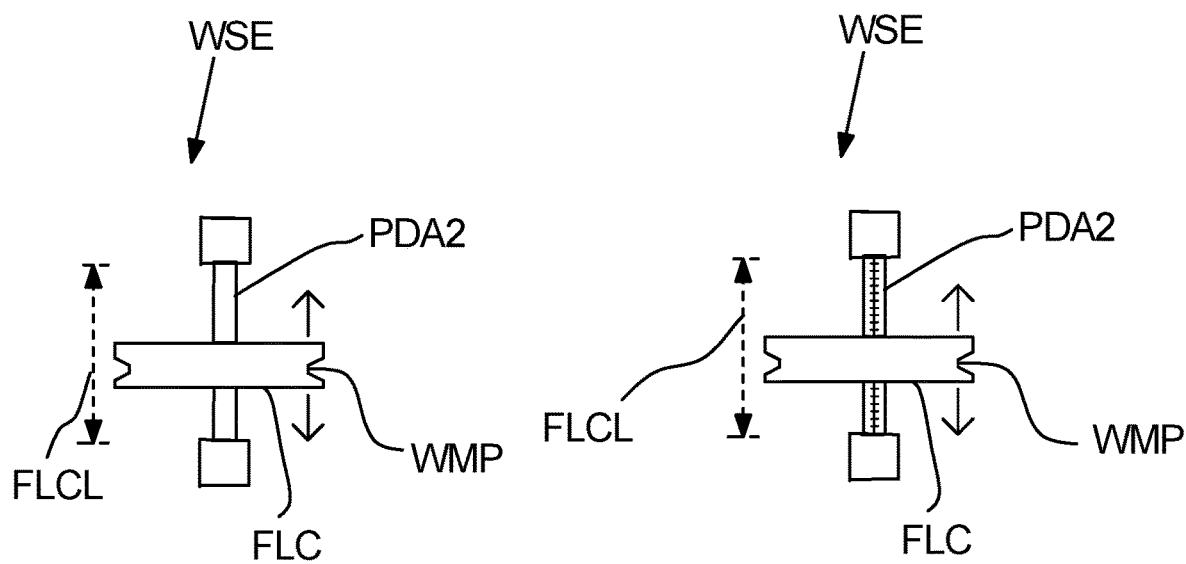
Fig. 5
Fig. 5a          Fig. 5b

STATIC WHEEL BALANCER

CROSS REFERENCE TO RELATED APPLICATIONS

This application is a U.S. National Phase Application of International Application No. PCT/DK2020/000228, filed Jul. 17, 2020, which is incorporated herein by reference in its entirety.

FIELD OF THE INVENTION

The present invention relates to a static wheel balancer for balancing wheels.

BACKGROUND OF THE INVENTION

Wheel balancing has in the past two-hundred years exhibited a challenge to obtain in simple fashion. Several inventions have been made such as static wheel balancing using a Bubble Wheel Balancer, a Vertical Rotational Wheel balancer or a Dynamic Wheel Balancing using rotational forces to measure the imbalance from the center hub or lugs of a wheel. These prior art devices have various disadvantages.

For a Bubble Wheel Balancer major disadvantage is a degree of inaccuracy and complicated adjustment before use and lack of absolute calculation of the imbalance weight. Such device is operated by adding imbalance weight to the wheel until the wheel is horizontal leveled. Thus, this requires that the devices are quite horizontal positioned under usage.

A Vertical Rotational Wheel Balancer commonly used for motorcycle or bicycle wheels works mostly and are limited to lightweight wheels with high diameter and small width of the wheel. This type of wheel balancer is not suitable for vehicle wheels for cars and busses, where the weight is too high compared to the diameter of the wheel.

A Dynamic Wheel Balancer which is mostly used for vehicle wheels by professional service points, are due to stability to the rotational forces, very heavy and consists of very complicated mechanical structures, and are not regarded transportable. Further these Dynamic Wheel Balancers are expensive, but also give an advantage of supporting lateral (or called dynamically) measurement of the imbalance of a vehicle wheel.

Many inventions of Wheel Balancers in prior art have been made in the past to solve the fundamental problem of measuring the mass imbalance of a rotational angle uniform geometry, such as a wheel. These devices show a complicated and expensive structure introducing many error sources.

It is one of many objectives and advantages of an embodiment of the present invention to solve the precise measurement of the imbalance mass of a rotational angle uniform geometry, such as but not limited to, a wheel with the use of Gravity by attachment to the edge or a rim of the wheel. A simpler device and process, that allows for a cheap, portable and accurate measurement and positioning of the compensation weight balancing is among the advantageous features.

SUMMARY OF THE INVENTION

The invention relates to a static wheel balancer; comprising: a wheel carrier (WC); wherein the wheel carrier includes at least two wheel support elements (WSE); wherein the wheel support elements (WSE) supports an edge of a wheel when the wheel is positioned in the wheel carrier and wherein the wheel support elements (WSE) defines a wheel positioning plane (WPP); and the static wheel balancer further comprising a weight measuring arrangement (WMA) including at least one load cell (LC); wherein a weight measuring point (WMP) of the load cell (LC) is arranged to measure a partial weight of the wheel (WH) at a selected wheel edge at a given angular orientation (AO) of the wheel (WH); and wherein the weight measuring point (WMP) is arranged at a predetermined distance (PD) to at least one of the at least two wheel support elements (WSE); and wherein the weight measuring point (WMP) forms part of at least one of the at least two wheel support elements (WSE); and the static wheel balancer further including a display (DP) arranged to display a measure of imbalance obtained on the basis of measured weight at the weight measuring point (WMP).

The measure of imbalance obtained on the basis of measured partial weight at the weight measuring point (WMP) may be a weight imbalance difference as such in the simplest version of the invention, but it may also be a complete direction to a user of how to correct the measured imbalance, e.g. by indication of which weight to be applied to the wheel and at which positions these weights must be applied. Furthermore, the display may also be applied for showing the measured imbalance over the wheel circumference.

It should be emphasized that wheel balancer according to the provisions of the invention has the benefit that the required measurements may be acquired as simply gravity force measurement denoted as weight.

This is an advantage and a significant difference from prior art wheel balancers requiring centripetal forces and therefore equipment for performing high speed rotation and force measurement or balancing arrangements without weight measurements.

According to an embodiment of the invention, the invention may include wheel support elements, which support a wheel. Support, supports, supporting or similar phrases used in the present context include, but is not limited to, means of holding, gripping, fixating, and fastening the wheel. It may be an advantage that the wheel support element(s) define a wheel reference positioning plane in which a wheel may be positioned. Wheel supporting elements may preferably include rolls or the like that allows rotational movement of a wheel when positioned in the static wheel balancer.

According to an embodiment of the invention, the invention may include one or more weight measuring arrangements. In a preferred embodiment of the invention, the weight measuring arrangement may form part of the at least two wheel support elements. Furthermore, it may be beneficial that the one or more weight measuring arrangements include one or more load cells configured to measure a partial weight of a wheel at the edge of the wheel when the wheel is positioned in the wheel positioning plane defined by the wheel support elements. Notice, that load cell may refer to any arrangement configured to measure a weight. In one embodiment of the invention it may be preferred that a load cell outputs an electrical or optical signal proportional to a weight. In another embodiment of the invention it may be an advantage that the load cell is a powerless mechanical scale for measuring weight.

According to an embodiment of the invention, the invention may include a display arranged to display a value of a measured imbalance weight. The value may refer to any representation of a weight measurement. In one embodiment it may be preferred that the weight measurement is displayed as a number. In a second embodiment of the invention, the weight measurement may be represented by physical weights or counterweights. The display may thus be implemented electronically/digitally or for example by traditional mechanical indicators. A digital display has the benefit that it may be applied for display of different and further types of communication, e.g. reference to wheel types, wheel size, angle of positioning of weights, size of weights, etc.

An embodiment of the invention may include a common scale such as those that may be bought on internet stores, home appliance stores or similar places. It may be preferred that the weight includes a display. Furthermore, it may be beneficial that a wheel support element is placed on top of the scale to permit accurate positioning of the wheel on the weight and to facilitate weight measurements at the edge of the wheel. It may be an advantage that the standard commercially available scale has an accuracy of the lowest level of needed imbalance compensation needed.

It should be noted that the principles within the scope of the invention does not rely on any inertia during measurement of imbalance. The inventive method may therefore be applied to other types of wheels than car wheels, such as bike wheels etc.

It should furthermore be noted that the principle of the inventive wheel balancer applies to wheel including a respective mounted tire or the wheel without a tire, including such as various types of flywheels.

It should also be noted that the wheel support elements are designed with respect to their intended function, i.e. to support the wheel in the correct positions throughout the measurements. The specifically applied wheel support elements may be designed as distinct mechanical objects may they may also form part of a surface or other continuous structure as long at the wheel is kept at the reference plane relative to the measuring point and as long as a representative measure of the gravity-induced weight may be obtained at the intended angular positions of the wheel.

In an embodiment of the invention, the wheel positioning plane (WPP) has an elevation angle (EA) of −45 to 45 degrees with respect to the horizontal plane (HZP).

According to an embodiment of the invention, it may be an advantage that the wheel positioning plane has an elevation angle of −45 to 45 degrees with respect to the horizontal plane. The elevation angle may aid in keeping a wheel fixed against the wheel support elements, when the wheel is positioned in the static wheel balancer, by utilizing the gravitational force. Notice that a low elevation angle may be preferred, given that it ensures more precise weight measurements. Thus, it should be noted that the elevation angle may be designed to be any value above −45 degrees and any value below 45 degrees with respect to the horizontal plane. Nevertheless, an elevation angle below −45 degrees and above 45 degrees may be applied in other embodiments of the invention.

In an embodiment of the invention elevation angle (EA) is 0 to 10 degrees with respect to the horizontal plane (HZP).

In an embodiment of the invention, the elevation angle (EA) is −35 to 35 degrees with respect to the horizontal plane (HZP).

In an embodiment of the invention elevation angle (EA) is −20 to 20 degrees with respect to the horizontal plane (HZP).

In an embodiment of the invention elevation angle (EA) is −10 to 10 degrees with respect to the horizontal plane (HZP).

In an embodiment the spread between more wheel support elements is not limited, as long the reference position can be maintained.

In an embodiment of the invention, the spread between the wheel support elements is 120 degrees with respect to a centre of the wheel an angular orientation of 0 degrees.

In an embodiment of the invention the weight measuring point (WMP) is arranged at a predetermined distance (PD) to at least one of the at least two wheel support elements (WSE) and wherein the predetermined distance (PD) is fixed.

In an embodiment of the invention, the weight measuring point (WMP) is arranged at a predetermined distance (PD) to at least one of the at least two wheel support elements (WSE) and the predetermined distance (PD) is floating and varies with the position of the measuring point (WMP) when the position of the measuring point is defined by the wheel edge (WE) when the wheel (WH) is repositioned or orientated in the static wheel balancer. Note that a wheel edge includes wheel rim, a tire mounted on the rim or areas around the rim.

In an embodiment of the invention the wheel balancer comprises at least two weight measuring arrangements (WMA).

According to embodiments of the invention, the static wheel balancer may include more than one weight measuring arrangement. Including additional weight measuring arrangements enable simultaneous partial weight measuring of the wheel at separate angular orientations of the wheel. This may be advantageous as it reduces the time it takes to balance a wheel, using the static wheel balancer if it is desired to increase the accuracy or speed of the partial weight measurements.

In an embodiment of the invention the static wheel balancer comprises a rolling arrangement (ROL) configured to enable orientation of a wheel (WH) relative to the weight measurement arrangement when the wheel (WH) is moved in the static wheel balancer.

In an embodiment of the invention, the weight measuring arrangement (WMA) comprises a fixed carrier (FIC) configured to measure weight at a weight measuring point (WMP) at a fixed predetermined distance (PD) to at least one of the at least two wheel support elements (WSE).

In an embodiment of the invention, the fixed carrier (FIC) is configured as at least one bearing or simpler rolling structure. The bearing may elsewhere be referred to as a roll in the present application.

According to an embodiment of the invention, the static wheel balancer may include a fixed carrier configured to measure partial weight of a wheel at a wheel edge at a fixed predetermined distance to at least one of the at least two wheel support elements. Notice that in the present context, wheel edge does not only refer to the edge of the wheel rim, as wheel edge in this context may also include a position on the or at other places on the wheel (including a tire mounted on the rim) with the exception of the geometrical center of the wheel. In an embodiment of the invention, the fixed carrier may therefore be configured to measure a partial weight of a wheel at the tire, still at a fixed predetermined distance to at least one of the at least two wheel support elements. In an embodiment of the invention, the fixed carrier may be configured as at least one bearing. The bearing may be configured to roll on the edge of a wheel that is positioned in the static wheel balancer and moved. In an alternative embodiment of the invention, the fixed carrier may be configured as at least one roll. The roll being configured to roll on the edge of a wheel when the wheel and the roll is moved with respect to each other.

In an embodiment of the invention, the weight measuring arrangement (WMA) comprises a floating carrier (FLC) that is moveably arranged to facilitate measurement of a partial weight of the wheel (WH) at a weight measuring point (WMP) at a variable distance to at least one of the at least two wheel support elements (WSE).

According to embodiments of the invention, the weight measuring arrangement may comprise a floating carrier. The floating carrier may support a wheel at the wheel edge when the wheel is positioned in the static wheel carrier. It is within the scope of the invention that the floating carrier may be configured to move in a first direction, so that the floating carrier is allowed to shift position according to variations in for example wheel diameter or wheel radius. A displacement of the floating carrier in a first direction may thus ensure that a partial weight of a wheel can be measured at the edge of the wheel at various angular positions, even if the wheel is not perfectly circular in shape.

In an embodiment of the invention, the floating carrier (FLC) is configured as at least one bearing or simpler rolling structure.

According to an embodiment of the invention it may be advantageous that the floating carrier is a bearing. In an embodiment of the invention, the floating carrier may be configured as a bearing that may roll on a wheel edge when the wheel is orientated in the static wheel balancer. In another embodiment of the invention, the floating carrier may be configured as a bearing that may roll on the wheel edge when the wheel is moved in the static wheel balancer.

In an embodiment of the invention, the floating carrier (FLC) includes at least one bearing with a groove, configured to roll on the edge of the wheel rims.

In a preferred embodiment, the wheel may have a groove that can interact with the edge on a wheel when the wheel is positioned in the static wheel balancer. It should be noted that the term wheel edge is understood broadly as a position when the radial positions is big enough to facilitate a proper measure of imbalance. The groove on the floating carrier bearing may ensure that the floating carrier rolls on the edge of the rim on the wheel, when the wheel is repositioned to another angular orientation thereby permitting weight measurements at the edge of the rim on the wheel.

In an embodiment of the invention, the floating carrier (FLC) is configured to grip the edge of the rim of the wheel (WH) when the wheel (WH) is positioned in the static wheel balancer.

According to an embodiment of the invention, the floating carrier may be configured to grip the edge of the rim of a wheel that is positioned in the static wheel balancer. A floating carrier configured to grip the edge of a wheel ensure that the floating carrier is in contact with the edge of the wheel rim of the wheel, thereby ensuring that weight measurements is acquired at the edge of the wheel rim of the wheel.

In an embodiment of the invention, the wheel balancer comprises runout measuring arrangement configured to measure runout of a wheel (WH), when the wheel is positioned in the static wheel balancer.

In an embodiment of the invention, the static wheel balancer may comprise a runout measuring arrangement, configured to measure runout of a wheel, when the wheel is positioned in the static wheel balancer. It is within the scope of the invention to applying the runout measurement of the wheel in the static wheel balancing procedure as this may improve the precision with which a static imbalance of the wheel can be determined, using the static wheel balancer. In the present context, runout of a wheel may refer to any deviation in wheel shape from a perfectly circular wheel. Runout may therefore be characterized as a variation in wheel radius across angular orientation of the wheel. The static imbalance of a wheel may refer to a condition, wherein the center of gravity of a wheel is displaced parallel to an axis passing through the geometrical center of the wheel.

In an embodiment of the invention, the weight measuring arrangement (WMA) comprises at least one positioning detection arrangement (PDA), configured to determine the position of the floating carrier (FLC) weight measuring point (WMP) when a partial weight of a wheel (WH) is measured.

Wheels are not typically perfectly circular and thus, the wheel diameter often varies across angular positions of the wheel. According to embodiments of the invention, it may therefore be advantageous to measure such deviations and further include this information to improve the accuracy with which the static imbalance of a wheel may be characterized using the static wheel balancer. In an embodiment of the invention, a positioning detection arrangement is therefore configured to measure the position of the weight measuring point, when the partial weight of the wheel is measured. It is within the scope of the invention to include information regarding the position of the weight measuring points and the partial weight of the wheel to characterize the static imbalance of the wheel. In an embodiment of the invention, information regarding the position of the weight measuring point relative to at least one wheel support element may be collected across various angular orientations and the information may further be utilized for characterizing the runout of a wheel.

According to an embodiment of the invention, it may be an advantage to obtain a measure of the runout of a wheel. It may be an advantage to measure variations in the wheel radius across all the angular weight measuring points of the wheel for which a partial weight of the wheel is measured. In an advantageous embodiment of the invention, variations in the diameter of a wheel may therefore be measured by measuring variations in the position of the weight measuring point relative to at least one of the at least two wheel support elements.

In an embodiment of the invention the positioning detection arrangement (PDA1, PDA2) comprises at least one micrometer, laser distance meter, a camera, and/or any combination thereof.

In an embodiment of the invention the second positioning detection arrangement (PDA2) is arranged to measure the position of the floating carrier (FLC) along the floating carrier length (FLCL) fixed to the Wheel Positioning Plane (WPP).

In an embodiment of the invention the static wheel balancer comprises a first detection arrangement (PDA1) configured to measure variations in the distance between the hub bore edge (HBE), the hub bore center axis (HBCA) and/or the center axis of the wheel and the weight measuring point (WMP) of a wheel (WH) when the wheel (WH) is positioned in the static wheel balancer and optionally fixed in the Wheel Positioning Plane (WPP).

In an embodiment of the invention, the positioning detection arrangement comprises at least one micrometer.

In an embodiment of the invention, the at least one micrometer is arranged to measure the position of the floating carrier (FLC) along the floating carrier length (FLCL).

In an embodiment of the invention, the positioning detection arrangement may comprise a micrometer. Notice that it is within the scope of the invention that the positioning detection arrangement may include any other means of detecting a position or any means of measuring a distance.

In an embodiment of the invention, the static wheel balancer may comprise a hub bore structure (HBS), configured to measure variations in the relative distance between the hub bore center edge often is regarded the wheel mounting reference (hub centric mounting) to the wheel center axis and the weight measuring point (WMP) of a wheel (WH), when the wheel (WH) is positioned in the static wheel balancer.

In an embodiment of the invention, the static wheel balancer may comprise a hub bore structure (HBS), configured to measure variations in the relative distance between the wheel lugs often regarded the wheel mounting reference (lug centric mounting) to the wheel center axis and the weight measuring point (WMP) of a wheel (WH), when the wheel (WH) is positioned in the static wheel balancer.

According to embodiments of the invention, it may be preferred that a runout distance of a wheel is measured at each angular orientation for which a weight measurement is performed. This has the benefit, that the runout of the wheel may then be defined as the variation in the radius across each angular orientation. Thus, in an embodiment of the invention, the static wheel balancer may comprise a hub bore structure (HBS) configured to measure a variations in the distance between the hub bore edge (WBE) of a wheel to the weight measuring point (WMP), when the wheel is positioned in the static wheel balancer.

In an embodiment of the invention, the static wheel balancer comprises a distance measuring arrangement configured to measure variations in the relative distance from the hub bore center axis to at least one of the at least two wheel support elements (WSE) at which the wheel edge (WE) is fixated.

In an embodiment of the invention, the static wheel balancer comprising a distance measuring arrangement configured to measure variations in the relative distance from the hub bore edge (HBE) to at least one of the at least two wheel support elements (WSE) at which the wheel edge (WE) is fixated.

In an embodiment of the invention the wheel balancer comprises a roll or rotor configured to roll on the edge of the hub bore (HBE) of a wheel (WH) when the wheel (WH) is positioned in the static wheel balancer.

In an embodiment of the invention the wheel balancer comprises a hub bore structure which may be applied for measuring by means of a wheel positioned roll or rotor on the axle of a wheel configured to roll on the edge of the hub bore (HBE) of a wheel (WH) realized as a wheel axle, when the wheel (WH) is positioned in the static wheel balancer.

In an embodiment of the invention the hub bore structure (HBS) is moveably arranged on the wheel carrier (WC).

In an embodiment of the invention, the hub bore may be moveably arranged on the wheel carrier. This may enable the hub bore structure to adjust to various wheel sizes and with various hub bore sizes or axle diameters In an embodiment of the invention, the static wheel balancer is configured to enable angular orientation (AO) of a wheel (WH) when the wheel is positioned in the static wheel balancer, thereby facilitating weight measuring of the wheel (WH) at various angular points (AP) on the wheel edge (WE).

According to an embodiment of the invention, the partial weight of a wheel may be measured at various angular points on the edge of the wheel, when the wheel is positioned in the static wheel balancer. In an embodiment of the invention, the wheel may be oriented when positioned in the wheel balancer to facilitate weight measuring at various angular points. Notice, that the precision with which the static wheel balancer may balance a wheel increases with the number of angular points for which a weight measurement is acquired. It is within the scope of the invention, that the number of angular points, at which a partial weight of a wheel is measured, is variable that and may be determined manually by an operator of the static wheel balancer. In another embodiment, the number of angular points, at which a partial weight of a wheel is measured, may be determined automatically by the static wheel balancer. In an alternative embodiment of the invention, it may be preferred that the static wheel balancer operates with a fixed number of angular weight measurements.

In an embodiment of the invention, the wheel balancer is configured to enable angular orientation (AO) of the wheel carrier with respect to a wheel (WH), when the wheel (WH) is positioned in the wheel carrier (WC), thereby facilitating partial weight measuring of the wheel (WH) at various angular points (AP) on the wheel edge (WE) and wherein the wheel balancer is configured to automatically store and correlate such measured data to corresponding representations of angular orientation.

In an embodiment of the invention, the static wheel balancer may be configured to enable angular orientation of a wheel carrier with respect to a wheel, thereby facilitating partial weight measuring of the wheel at various angular points on the edge of the wheel.

In an embodiment of the invention, the static wheel balancer may be configured to enable an informational overall weight calculation of the wheel.

In an embodiment of the invention a wheel (WH) can be oriented in predetermined steps of angular orientation (AO), to enable weight measuring at various angular points (AP) on the wheel (WH).

It may be an advantage that multiple weight measurements of the wheel is acquired at predetermined angular point on the edge of a wheel in a step-wise fashion, by orienting the wheel in steps of predetermined angular degrees, while the wheel is positioned in the static wheel balancer. For each of these orienting steps, the wheel may be kept still while a weight measurement is acquired at the specific predetermined angular point on the edge of the wheel. The number of angular points at which the partial weight of the wheel is measured and the angular distance between each of these angular points may vary. In another embodiment of the invention an adaptive approach may be applied, namely increasing the angular resolution at areas where a significant imbalance is measured. Notice that increasing the number of angular weight measuring points may increase the precision with which a wheel can be balanced, using the static wheel balancer, while at the same time increasing the time it takes to balance a wheel, with the static wheel balancer. In another embodiment of the invention, weight measurements may be acquired at the edge of a wheel while the wheel is being actively rotated. Weight measuring may thus be acquired continuously without having to interrupt the rotation of the wheel. Orientating the wheel to measure a partial weight of a wheel at various angular positions of the wheel, may be beneficial in an embodiment of the invention that only has one weight measuring arrangement, although it is within the scope of the invention to include more than one weight measuring arrangement to measure a partial weight of a wheel, when the wheel is positioned in the static wheel balancer.

In an embodiment of the invention the static wheel balancer is configured to enable angular orientation (AO) of a wheel (WH) when the wheel (WH) is positioned in the static wheel balancer, thereby facilitating partial weight measuring of the wheel (WH) at various angular points (AP) on the wheel edge (WE) without having to lift the wheel out of the wheel carrier (WC).

In an embodiment of the invention the static wheel balancer according to any of the preceding claims, wherein a wheel (WH) can be oriented powerless and manually, when the wheel (WH) is positioned in the static wheel balancer.

In an embodiment of the invention, wheel may be oriented manually, when the wheel is positioned in the static wheel balancer. Therefore, this embodiment of the invention has the benefit that the static imbalance of a wheel may be determined and reduced without the need of a motor to position the wheel.

In an embodiment of the invention, the static wheel balancer comprises a motor (M) configured to orientate a wheel (WH) under control of a central processing unit (CPU) when the wheel (WH) is positioned in the static wheel balancer.

In an embodiment of the invention, the static wheel balancer may comprise a motor configured to orientate a wheel, when the wheel is positioned in the static wheel balancer. This has the benefit that orientation of the wheel may be performed automatically.

In an embodiment of the invention, the static wheel balancer comprises a motor (M) arranged to rotate at least one of the at least two wheel support element (WSE) thereby enabling angular orientation (AO) of a wheel (WH), when the wheel (WH) is positioned in the static wheel balancer.

According to an embodiment of the invention, the static wheel balancer may comprise a motor configured to angularly orientate the wheel, when the wheel is positioned in the static wheel balancer. In a preferred embodiment of the invention, the motor may rotate at least one of the at least two wheel support elements in a first direction, thereby indirectly applying force to the wheel so that it orientate in the wheel reference positioning plane. In another embodiment of the invention, the motor may rotate the wheel by exerting force to the wheel or the tire through a separate drive attachment system.

In an embodiment of the invention, the at least two wheel support elements (WSE) are configured to support various wheel sizes.

In an embodiment of the invention, the at least two wheel support elements may be configured to support various wheel sizes.

In an embodiment of the invention, the at least one of the at least two wheel support elements (WSE) includes a gripping configured to grip the edge of a wheel.

According to embodiments of the invention, the at least two wheel support element may be formed as a gripper holding the edge of the wheel in a firm and fixed reference position when weight measurement is performed. Other embodiments within the scope of the invention may include the use of several support elements or other types of mechanical or electromechanical ways of fixating the edge of the wheel. The at least two wheel support elements may in an advantageous embodiment of the invention include rotating fixating elements, thereby allowing orientation of the wheel when positioned in the wheel balancer.

In an embodiment of the invention, a motor (M) can be activated to move at least one of the at least two wheel support elements (WSE) in a first direction of the wheel positioning plane (WPP) to enable support of various wheel sizes.

According to embodiments of the invention, the static wheel balancer may include a motor that can be activated to move at least one of the at least two wheel support elements in a first direction of the wheel positioning plane to enable support of various wheel sizes. Embodiments of the invention may include a manually operated actuator of the motor. In other embodiments within the scope of the invention, the motor may be activated automatically by a central processing unit based on input received by the central processing unit.

In an embodiment of the invention the static wheel balancer comprises three wheel support elements (WSE).

In an embodiment of the invention the static wheel balancer comprises four or more wheel support elements (WSE).

According to embodiments of the invention, it may be advantageous that the static wheel balancer includes three or more wheel support elements to ensure sufficiently stable support of a wheel when the wheel is positioned in the static wheel balancer. Other embodiments of the invention may comprise further wheel support elements to further increase the support of a wheel positioned in the static wheel balancer. Thus, an embodiment of the invention may comprise four wheel support elements. Increased wheel support may be an advantage when balancing large and/or heavy wheels.

In an embodiment of the invention, the static wheel balancer comprise: a central processing unit configured to calculate the static imbalance of a wheel (WH); wherein the central processing unit includes a processor; and a control unit; and an arithmetic logic unit; and memory; and a data input and a data output.

According to an embodiment of the invention, the static wheel balancer may comprise a central processing unit, configured to calculate the static imbalance of a wheel. The central processing unit may comprise a processor, a control unit, an arithmetic logic unit, memory and a data input and a data output. The input data may comprise of partial weight measurements of the wheel at various angular points on the edge of the wheel but is not limited here to. In the present context, static imbalance refers to a condition, wherein the center of gravity of a wheel is displaced parallel to an axis passing through the geometrical center of the wheel. It may be an advantage that the central processing unit comprises a control unit and an arithmetic logic unit, memory for storing information, and a data input and a data output. In the present context the data input and the data output may be applied for input of data, comprising but not limited to the measured weight, and for output of data based on the input. Other input data may for example include data from the positioning detection arrangement.

In a preferred embodiment of the invention, data from the processing unit may be fed to a display directly via suitable display drives.

In another embodiment of the invention may, the central processing unit may, in addition to the weight measurements of a wheel, may receive additional data from the positioning detection arrangement. The additional data, describing the physical position runout of the weight measuring point for each of the acquired weight measurements. The data describing the physical positioning of each weight measuring point thus contain information regarding variation in wheel radius runout across each of the angular points, at which, a partial weight of the wheel is measured. It may be an advantage to apply both information regarding the weight and regarding the position of the weight measuring point, when calculating the static imbalance of a wheel, as this may improve the accuracy of the calculation.

It is within the scope of the invention that the central processing unit may receive two weight measurements of a wheel, both measured at the same angular position. One of these two weight measurements may be acquired using a fixed carrier that measures a weight of the wheel at a predetermined and fixed distance to at least one wheel support element. The other of the two weight measurements may be acquired using a floating carrier, which position is configured to vary with the diameter of the wheel such that partial weight measurements of a wheel may be acquired at variable distances to at least one wheel support element. The central processing unit may apply both weight measurements to calculate the static imbalance of a wheel. This has the benefit that no additional measurements regarding the position of the weight measuring point or regarding variations in wheel diameter is needed.

In an embodiment of the invention, the central processing unit is configured to activate a motor (M) to rotate a wheel (WH), when the wheel (WH) is positioned in the static wheel balancer.

According to an embodiment of the invention, the static wheel balancer may comprise a central processing unit, configured to activate a motor. In an embodiment of the invention, the motor may be configured to rotate a wheel when then wheel is positioned in the static wheel balancer.

In an embodiment of the invention, the central processing unit may activate the motor to rotate a wheel a predetermined sum of angular degrees, when the wheel is positioned in the static wheel balancer. In an embodiment of the invention, the central processing unit may receive a feedback signal when a weight measurement is completed at a given angular orientation. It may be an advantage that the feedback signal may trigger an activation of the motor to rotate the wheel the predetermined angular degrees. It may be a further advantage that the steps of measuring a partial weight of a wheel, followed by angular orientation of the wheel in predetermined angular steps, is performed until measurements has been acquired at all of a predefined set of angular orientations of the wheel.

In an embodiment of the invention, the static wheel balancer comprises a counterweight indicator (CWI) configured to indicate the location to which weight should be added to a wheel (WH) in order to reduce static imbalance of the wheel (WH).

In an embodiment of the invention, the central processing unit may activate the motor to rotate the wheel, while at the same time, activating a weight to measure the weight of the wheel while the wheel is rotating.

According to an embodiment of the invention, the static wheel balancer may comprise a central processing unit. The central processing unit may be configured to calculate the static imbalance of a wheel. It may be a further advantage that the central processing unit is configured to calculate at least one location and a corresponding weight that should be applied to the wheel at the at least one location, in order to reduce the static imbalance of the wheel. Notice that it may be beneficial to reduce the static imbalance of a wheel by applying weights or counterweights to more than one location on the wheel.

In an embodiment of the invention the counterweight indicator (CWI) is a mechanical indicator.

According to an embodiment of the invention, the invention may include a counterweight indicator configured to indicate locations on a wheel to which weight or counterweights should be placed in order to reduce a static imbalance of a wheel.

In an embodiment of the invention, a counterweight indicator may be configured as a mechanical indicator of any shape and size.

In an embodiment of the invention the counterweight indicator (CWI) counterweight indicator (CWI) comprises a light source.

It may be an advantage that the counterweight indicator comprises a light source. In the present context a light source may include, but is not limited to, one or more LED lights or one or more laser light sources.

In an embodiment of the invention the counterweight indicator (CWI) comprises a display (DP).

In another embodiment of the invention, it may be preferred that the counterweight indicator comprises a display.

In an embodiment of the invention, the static wheel balancer is configured to activate a motor (M) to rotate a wheel (WH) or a counterweight indicator (CWI) into an angular position (AP) at which, the counter weight indicator (CWI) indicate a location to which weight should be added to the wheel (WH), in order to reduce a static imbalance of the wheel (WH).

According to an embodiment of the invention, the central processing unit may calculate one or more locations on a wheel and the corresponding weight to add to these locations on the wheel in order to balance the wheel. In a preferred embodiment of the invention, the central processing unit is configured to activate a motor to rotate a wheel positioned in the static wheel balancer into an angular position at which, a counter weight indicator indicate a location to which the weight should be added. In another embodiment of the invention, the central processing unit may activate the motor to move a counterweight indicator into an angular position at which the counter weight indicator indicate a location to which weight should be added to the wheel, in order to balance the wheel.

The invention furthermore relates to a method for static wheel balancing, wherein the method comprises the steps of: measuring the partial weight of a wheel (WH) at a wheel edge (WE) in at least two angular positions (AP); calculating the static imbalance of the wheel on the basis of at least weight measures obtained in the at least two angular positions; and calculating at least one mass of counterweight (CW) and corresponding angular position(s) (CAP) of the wheel where the at least one mass of counterweight is to be applied, in order to reduce the static imbalance of the wheel, applying the at least one mass of counterweight to the wheel at the corresponding angular position(s) and/or displaying a measure of imbalance obtained on the basis of measured weight at the weight measuring point (WMP).

The displaying of a measure of imbalance obtained on the basis of measured weight at the weight measuring points may include displaying a value representing the at least one mass of counterweight and a value representing the corresponding angular position(s) of the at least one mass of counterweight where a counter weight should be mounted in order to reduce the measured imbalance.

The measure of imbalance obtained on the basis of measured weight at the weight measuring point (WMP) may be a weight as such in the simplest version of the invention, but it may also be a complete direction to a user of how to correct the measured imbalance, e.g. by indication of which weight to be applied to the wheel and at which positions these weights must be applied. Furthermore, the display may also be applied for showing the measured imbalance over the wheel circumference.

It should also be noted that the displaying of the measure of imbalance may be performed by means of a display included in a device performing the method of the invention, but it may also be displayed at an associated device, such as a smartphone, tablet, laptop etc. communicating with the static wheel balancer by means of wired or wireless connection(s).

In the present context, static imbalance of the wheel refers to an imbalance, wherein the center of gravity of a wheel is displaced parallel to an axis passing through the geometrical center of the wheel. Thus, calculating the static imbalance of a wheel may in the present context refer to calculating this relative displacement. Such relative displacement of the center of mass may cause unwanted vibration of the wheel when the wheel is used for driving a vehicle, and in turn placing additional stress on parts of the vehicle potentially causing damage of the parts.

In an embodiment of the invention, the partial weight of the wheel is measured when the wheel is positioned in a wheel positioning plane (WPP).

In an embodiment of the invention, the partial weight of the wheel is measured at a predetermined distance (PD) to at least one of at least two wheel support elements (WSE).

In an embodiment of the invention, the partial weight of the wheel is measured at a variable predetermined distance to at least one of at least two wheel support elements (WSE).

In an embodiment of the invention, the position of a weight measuring point (WMP) relative to a at least one of at least two wheel support element (WSE) is determined where a corresponding partial weight measurement of a the wheel is acquired.

In an embodiment of the invention, the position of a weight measuring point (WMP) relative to a at least one of at least two wheel support element (WSE) is determined when a corresponding partial weight measurement of a the wheel is acquired.

In an embodiment of the invention, variations in the position of a weight measuring point (WMP) relative to a at least one of at least two wheel support element (WSE) across a number of angular positions (AP) is determined.

In an embodiment of the invention, variations in the position of a weight measuring point (WMP) relative to a at least one of at least two wheel support element (WSE) across a number of angular positions (AP) is determined.

In an embodiment of the invention, variations in the position of a weight measuring point (WMP) relative to a wheel center axis, a hub bore center axis (HBCA) and/or a hub bore edge (HBE) of the wheel across a number of angular positions (AP) is determined.

In an embodiment of the invention runout is determined based on determined or derived runout measured by means of at least a second position detection arrangement (PDA2) and optionally also a first position detection arrangement (PDA1) at relevant angular positions.

In an embodiment of the invention, runout is determined based on variations in determined or derived runout distances (ROD) across the angular positions.

In an embodiment of the invention, runout is determined based on measured runout distances (ROD) at the angular positions.

In an embodiment of the invention, runout is determined based on variations in measured runout distances (ROD) across angular positions.

In an embodiment of the invention, runout is determined based on measured fixed and floating weight measurements at the angular positions.

According to embodiments of the invention, runout determined based on measured fixed and floating weight measurements at said angular positions may be determined by deriving the runout distance from the weight measurements.

In an embodiment of the invention, the static weight imbalance of the wheel is adjusted for runout of the wheel.

According to embodiments of the invention, the runout of a wheel may be characterized by a variation in radius or diameter of a wheel across various angular positions of the wheel. Notice that it is within the scope of the invention, to determine runout as a variation in the relative position between, a weight measuring point positioned at an edge of the wheel, and at least one of the at least two wheel support elements. However, in an embodiment of the invention it may be preferred to characterize the runout of a wheel by the distance between the hub bore center axis or the hub bore edge and at least one wheel support element or at least one measuring point.

In an embodiment of the invention, runout is characterized as a variation in the runout distance (ROD) across all angular positions (AP) at which a weight is measured.

According to an embodiment of the invention, the runout distance may be defined as the distance from the weight measuring point to the hub bore center axis of a wheel. In an embodiment of the invention, it may be preferred that the runout distance is determined as the distance from the edge of a wheel rim to the hub bore center axis of the wheel. In other embodiments of the invention it may be an advantage to determine the run of distance relative to the edge of the hub bore of the wheel rather than relative to the hub bore center axis. Furthermore, it is within the scope of the invention to determine the run of distance as the distance between the weight measuring point and at least one of the at least two wheel support elements.

In an embodiment of the invention, runout distance (ROD) is characterized as a variation in the radius across all angular positions (AP) at which a weight is measured.

In an embodiment of the invention, the runout distance (ROD) is determined or derived for each weight measurement.

According to an embodiment of the invention, the runout distance may be measured or derived directly. Notice that it is within the scope of the invention to measure or derive the runout distance indirectly.

According to an embodiment of the invention, it may be beneficial to determine or derive the runout distance of a wheel. Further, in an embodiment of the invention, the runout distance may be measured, for example by using a micrometer. However, it is within the scope of the invention to apply other means of measuring the runout distance of a wheel. Moreover, it is within the scope of the invention to determine or derive the runout distance indirectly, for example based on measured projected distances of the runout distance or on the basis of variations in the runout distance or projections of the runout distance across a number of angular positions. Projected distances may for example include, but is not limited to, distances that is projected from the wheel support plane into the horizontal plane. Furthermore, it may be an advantage to derive the runout distance based on measurement of other distances. These other distances may for example include the diameter of the wheel and/or the distance(s) from the hub bore center axis to one or more wheel support elements or projections of these distances into other planes or any other distances from which the runout distance may be derived or approximated.

In an embodiment of the invention, variations in the runout distance (ROD) across a number of angular positions is determined using variations in at least one relative projected distance from the weight measuring point (WMP) to at least one of the at least two wheel support elements (WSE), and variations in at least one relative projected distance from a hub bore center axis (HBCA) or a hub bore edge (HBE) or axle to at least one of the at least two wheel support elements (WSE).

In an embodiment of the invention it is possible to either determine or measure runout in the wheel plane or it may be measured as projections in other planes, for example in the horizontal plane and corrected mathematically.

According to embodiments of the invention, it is within the scope of the invention to determine or derive the projected distance from the wheel or hub bore center axis or the hub bore edge of a wheel to at least one wheel support element. It is within the scope of the invention to determine or derive other distances from the hub of the wheel to at least one wheel support element.

According to an embodiment of the invention, variations in the projection of the runout distance into the horizontal plane, or other planes, across angular positions, may be derived using variations in other distances. It may be an advantage that these other distances include a relative measure of wheel diameter and a relative measure of the wheel radius.

In an embodiment of the invention, two weight measurements of a wheel are acquired at the same angular orientation; the two weight measurements comprising a partial weight of the wheel measured at a fixed predetermined distance (PD) to at least one of at least two wheel support elements, and a partial weight of the wheel measured at a variable predetermined distance to at least one of at least two wheel support elements.

An advantage of this embodiment is obtained as it is now possible to measure a wheel having no bore as runout may be compensated without a need to measure the physical runout by means of a positioning detection arrangement.

According to an embodiment of the invention, the runout distance of a wheel may be characterized based on two separate weight measurements acquired at the same angular orientation of the wheel. One weight measurement may be obtained at a fixed predetermined distance between the weight measuring point and at least one of the at least two wheel support elements, whereas the other of the two weight measurements may be obtained at a variable distance from the weight measuring point to at least one of the at least two wheel support elements. In the present context, variable distance denotes that said variable distance may vary between angular orientations of the wheel. In an advantageous embodiment of the invention, the variable distance may vary with variations in the shape of the wheel, for example including variations in wheel diameter or variations in the distance between wheel support element and the weight measuring point. It is within the scope of the invention to utilize the said two separate weight measurements acquired at the same angular orientation of the wheel, to characterize the runout distance or variation in runout distance across angular orientations of the wheel, and further to apply said runout distance or said variation in runout distance, to adjust the obtained imbalance weight measurements of the wheel.

In an embodiment of the invention, the partial weight of the wheel is continuously acquired at angular positions while the wheel is slowly rotating. Slowly rotating defined as where the centripetal forces do not influence the partial weight measurement.

In an embodiment of the invention, the orientation of the wheel and corresponding weight measurement is repeated until measurement have been acquired for a number of angles covering the circumference of the wheel.

According to embodiments of the invention., the partial weight of a wheel may be measured in several different angular positions depending on the desired circumferential/angular resolution. In an advantageous embodiment of the invention, an exemplary practical application may include weight measurement in 36 angular positions. Evidently it is within the scope of the invention that the wheel WH may be weighted at more or fewer angular positions. Notice, that the more angular positions that is included in the wheel balancing procedure, the more precise a wheel balancing may be achieved. Nevertheless, it may be preferred to include fewer than said 36 angular weight measurements in the wheel balancing procedure to shorten the time it takes to balance a wheel with the static wheel balancing principle.

In an embodiment of the invention, a weight measurement is fed to a central processing unit, which automatically calculate the static imbalance of a wheel and a counterweight (CW) and position to place the counterweight on the wheel in order to reduce the static imbalance of the wheel, the central processing unit automatically calculating at least one mass of counterweight and corresponding angular position(s) (CAP) of the wheel where the at least one mass of counterweight is to be applied, in order to reduce the static imbalance of the wheel, and outputting data representing the at least one mass of counterweight and a value representing the corresponding angular position(s) of said at least one mass of counterweight on a user interface.

According to embodiments of the invention. the user interface may include a display, a loudspeaker, visual indications, whatever suitable for enabling a user of reducing or compensating the static imbalance of the wheel.

In an embodiment of the invention, the at least one mass of counterweight (CW) and corresponding angular position(s) (AP) of the wheel is calculated on the basis of the difference between the imbalance weights measured at opposite measuring points at different angular positions of the wheel.

In an advantageous embodiment the at least one mass of counterweight and corresponding angular position(s) of the wheel is calculated on the basis of the maximum difference between the imbalance weights measured at opposite measuring points at different angular positions of the wheel. In other words, a weight distribution, e.g. measured at one angular position.

In an embodiment of the invention, the at least one mass of counterweight and corresponding angular position(s) of the wheel is calculated on the basis of the difference between the weights measured at opposite measuring points at different angular positions of the wheel, wherein the difference between the imbalance weights measured at opposite measuring points at different angular positions is compensated for runout.

In an embodiment of the invention, the imbalance weight measurements of a wheel are adjusted for runout.

In an embodiment of the invention, the at least one mass of counterweight and corresponding angular position(s) of the wheel is calculated and suggested on the basis of the equation:

$$m_{\theta b} = \mathrm{MAX}\overline{m_\theta} - \mathrm{MIN}\overline{m_\theta}$$

$m_{\theta b}$ is the mass of the counterweight at the counter weight position APn $\overline{m_\theta}$ is the calculated imbalance for all positions APn It is within the scope of the invention to calculate at least one mass of counterweight and corresponding angular positions of the wheel to reduce the static imbalance of a wheel. It is within the scope of the invention to calculate the counterweight and the corresponding position on the basis of imbalance weight measurements. In a further embodiment of the invention, the counterweight and corresponding positions may be adjusted for variation in wheel shape, with the benefit of achieve a further reduction in static wheel imbalance of a wheel.

THE DRAWINGS

Various embodiments of the invention will in the following be described with reference to the drawings where FIGS. 1a and 1b illustrate a top view and a side view of a static wheel balancer without a wheel mounted within the scope of the invention, FIG. 2 illustrate a top view of a static wheel balancer with a wheel mounted within the scope of the invention, FIG. 3 illustrates principles of a static measurement within the scope of the invention, FIG. 4 illustrates principles of fixed measuring within the scope of the invention, FIGS. 4a and 4b illustrates possible implementations of a fixed measuring within the scope of the invention, FIG. 5 illustrates principles of a floating measurement within the scope of the invention, FIGS. 5a and 5b illustrates possible implementations for floating measuring within the scope of the invention, FIG. 6a illustrates an implementation of a position detection applied for detection of the hub bore center edge in an embodiment of the invention, FIG. 6b illustrates an implementation of a position detection applied for detection of the wheel center axle axis in an embodiment of the invention, FIG. 7 illustrates a two-wheel support structure embodiment within the scope of the invention and where FIG. 8 illustrate two different ways of correcting for runout within the scope of the invention.

DETAILED DESCRIPTION

FIGS. 1a and 1b illustrate principles of the method applied according to an embodiment of the invention.

In FIGS. 1a and 1b principles of a static wheel balancer within the scope of the invention is explained in a top view and a side view, respectively. The same static wheel balancer is shown in FIG. 2, now including a wheel WH positioned in the wheel balancer.

The static wheel balancer SWB comprises a wheel carrier body WC supporting a number of wheel supporting elements WSE, WSE' and WSE". The wheel supporting elements WSE, WSE' and WSE" are all adjustably fitted to the wheel carrier body WC. The wheel supporting elements WSE, WSE' may in the illustrated embodiment be adjusted in the y-direction and a crossbar carrying the wheel supporting elements may be adjusted in the x-direction by means of an adjustment fastener FA. In the present context three wheel supporting elements have been applied. Other numbers of wheel supporting elements may be applied within the scope of the invention. The wheel supporting elements WSE, WSE' and WSE" define a wheel position plane WPP, which is the plane extended by a wheel when the wheel is inserted or positioned in the static wheel balancer as shown in FIG. 2.

The wheel supporting elements WSE, WSE' and WSE" are designed to fixate an edge portion of an inserted wheel WH, e.g. a rim of the wheel, at a predetermined distance relative to a weight measuring point WMP of a weight measuring arrangement WMA. A load cell LC is designed to register, preferably automatically, measured weight and corresponding measured angular positions. In the illustrated embodiment, the wheel measurement point WMP is designed to be as part of the wheel support elements, and in the specific embodiment the weight measuring point WMP is a the same time part of the wheel support element WS".

In the present context this predetermined distance may either be a completely fixed distance which does not vary when the wheel is repositioned and weight-measured around the circumference of the wheel/tire or the wheel, defined as a fixed measurement. In such a case, the wheel structure may roll at contact circumference on the wheel supporting structure. The reason for a variation (if any) in where the measuring is performed on the wheel/tire may be that the wheel has a so-called runout, i.e. that the wheel rim does not describe a perfect circle. A fixed measurement as described above is illustrated in FIG. 4

An alternative way is to perform a so-called floating measurement, where the measuring point of the weight measurement follows the rim or a derivative thereof, whereby the distance between the wheel supporting elements WSE, WSE' and WSE" are floating by following the imperfect circle defined by the wheel rim, but still the distance is regarded as predetermined according to the provisions of the invention insofar as the predetermined distance is completely determined by the wheel geometry such as the wheel rim. A floating measurement as described above is illustrated in FIG. 5.

A wheel WH is subjected to a partial weight measurement at a wheel edge WE in at least two angular positions AP1, AP2, and successive APn. The angular positions are spaced at angular orientation AO apart. The angular distances may be equal of they may vary if so desired. In the present context, the wheel edge WE is an approximate circumference with its center placed approximately at the center of a wheel. Notice, that the wheel edge WE may be located within an area spanning from the hub bore edge HBE of a wheel WH to and including the wheel rim WHR and optionally further including a tire TIR that may be mounted on the wheel WH. The angular positions AP1, AP2, APn are distributed on a circumference describing the wheel, preferably the wheel edge.

Within the scope of the invention, the weight may be measured in several different angular positions APn depending on the desired circumferential/angular resolution. An exemplary practical application may include weight measurement in 36 angular positions using a weight measuring arrangement WMA. The weight measuring arrangement WMA comprises a load cell. Evidently, the wheel WH may be weighted at more or fewer angular positions APn if so desired. However, the more angular points APn that is included in the wheel balancing procedure, the more precise a wheel balancing may be achieved. Nevertheless, it may be preferred to include few, for example 3 or 4, angular weight measurements in the wheel balancing procedure, to shorten the time it takes to balance a wheel WH with the static wheel balancing principle or as high as 360 for very high diameter wheels.

Furthermore, it should be noted that the weight measures may be obtained in a system comprising one or more weight measuring points WMP. If only one weight measuring point WMP is applied, the wheel must be repositioned during the complete measuring cycle.

It is advantageous to apply weight measures at angular positions APn uniformly distributed across the wheel edge WE of the wheel WH or adaptively adjust the angular orientation based on the weight change level.

In other embodiment it may also be possible to apply weight measures at angular positions AP non-uniformly distributed across the wheel edge of the wheel WH.

Upon measuring partial weight of the wheel WH, the static imbalance of the wheel WH is calculated on the basis of at least weight measures obtained in said at least two angular positions AP1 and AP2. The calculation of the static imbalance may in principle be performed manually by human interaction, however, according to a preferred embodiment of the invention, the weighing and calculation is performed automatically, for example using a central processing unit e.g. located inside the weighting measurement arrangement (not shown). Furthermore, an embodiment of the invention may include a display DP, configured to but show representations of an output of the central processing unit. This may include for example relative partial weight measurements of the wheel. Notice that the display may be configured to show or represent any thinkable information, including but not limited to, for example, angular position or orientation of a wheel, wheel size, calculated wheel weight, wheel diameter or radius, maximum runout and runout.

Subsequently, or at the same time, the method includes the process of calculating at least one mass of imbalance counterweight CW and corresponding angular position(s) CAP of the wheel WH where to the at least one mass of imbalance counterweight CW is to be applied, in order to reduce the static imbalance of the wheel WH. This calculation may in principle also be performed manually by human interaction, but according to a preferred embodiment of the invention, the weighing and calculation is performed automatically.

Finally, the at least one mass of imbalance counterweight CW may be fixated to the wheel at the corresponding angular position(s) CAP. The fixation can be done at a location manually identified by an operator. However, it is within the scope of the invention, that the fixation and/or identification of the imbalance counterweight CW location may be done automatically. In an advantageous embodiment of the invention, a counterweight indicator CWI is configured to indicate the corresponding angular position CAP of a wheel at which at least one mass of imbalance counterweight CW is to be applied, in order to reduce the static imbalance of the wheel WH. In the presently shown embodiment a motor (not shown) located inside the weight measurement arrangement and controlled by the central processing unit orientates the wheel after measurements have been performed to that the counterweight indicator points the angular position where an imbalance counter weight should be placed and the display indicates the imbalance weight to be fastened to the wheel thereby making it extremely easy for a user to fit the imbalance counterweight correctly.

The same may also be applied for the purpose of performing an automatic orientation of at least 360 degrees continuously or in steps while automatically obtaining the weight at the desired angular positions. The correlation of weight measures with corresponding angular positions should be performed automatically under control of the central processing unit.

FIG. 1b illustrates a sideview of the static wheel balancer of FIG. 1a. It is here shown that the wheel position plane WPP is angled with an elevation angle EA. In an embodiment of the invention it may be preferred that the partial weight of a wheel is measured when the wheel is positioned in a wheel positioning plane WPP that has an elevation angle EA with respect to the horizontal plane HZP. It may be preferred that the elevation angle EA is between −45 to 45 degrees, to keep the wheel fixed in at least one wheel support element positioned at a different angular position than the weight measuring arrangement. One advantages of such arrangement is that the fixation of the wheel WH in and relative to the wheel support elements WSE are simply obtained through gravity. Nevertheless, it is within the scope of the invention to measure partial weight of a wheel at other elevation angles EA, e.g. at an elevation angle of close to 0 degrees with respect to the horizontal plane. In such an embodiment it is however noted that the wheel must be fixed at the desired predetermined distance between weight measuring point WMP and corresponding wheel support elements by other measures than gravity. In an advantageous embodiment of the invention, the elevation angle is between 1 to 10 degrees, thereby benefitting from an easy use in the sense that a user may simply input the wheel into the balancer without a need to secure or fasten the wheel to the balancer. A low elevation angle has the benefit that accuracy of certain embodiments is high.

In the illustrated embodiment the wheel carrier WC is formed as a structure which may be applied in a close to horizontal manner during use. Several other designs may be applied within the scope of the invention if the wheel carrier support the wheel support elements and thereby a wheel in a desired wheel position plane WPP.

The illustrate exemplary static wheel balancer is shown with a hub bore structure HBS, which may be adjusted relative to the supporting wheel carrier WC in the x-direction by means of a roller ROL rotating in the x and y-plane. The hub bore structure may be applied for measuring a value representative of runout, i.e. applicable for a so-called floating measurement by following and measuring variations of a hub bore edge.

A suitable exemplary hub bore structure FIBS to be used for distance measurements are illustrated in FIG. 6a. The hub bore structure FIBS includes a first position detection arrangement PDA1 Other distance measurement arrangements may be applied within the scope of the invention. Such distance measurement arrangements may include difference configurations of micrometers or laser-based distance measuring equipment. Another type of floating distance measurement arrangement may include optical vision-based measurements.

The floating movement of the wheel measuring point WMP may be measured by a second position detection arrangement PDA2 and the two values may together be applied for establishing a value of effective runout.

Also note that the example of FIG. 6b shows how the presently illustrated embodiment may be adjusted to measure a representation of run-out of a wheel including bearing and axle, such as a bike wheel.

It should be noted that the above described embodiment may be modified to exclude compensation for runout if so desired at many or most practical use cases will obtain a completely sufficient and satisfactory determination of wheel imbalance on the basis of a fixed or floating weight measurement, only. Evidently, such wheel balancers may therefore be implemented with only one measuring type only. One such advantageous embodiment would be obtained using a fixed weight measure only, thereby not requiring the use of additional floating distance or weight measurement arrangements. In such a variation the embodiment of FIG. 1a to 2 would be modified not to include the above described hub-bore structure HBS and simply rely on the weight measurement obtained by the weight measuring arrangement, be it fixed or floating. In many cases runout may be ignored, and such case imbalance may be sufficiently compensated anyway.

It should be noted that devices within the scope of the invention applying both fixed and floating measures may obtain impressive measures and higher accurate compensation in a very cost-effective way.

Preferably, the static wheel balancer includes at least one central processing unit (not shown) included with the weight measurement arrangement WMA facilitating, when the static wheel balancer is activated, automatic orientation of the wheel, automatic initiation of weight measures, automatic registration or estimation of angular positions related to such measures and output arrangement for displaying of relevant data on the display and optionally for automatically turning the wheel into a position where a counter weight indicator indicates angular positions where respective imbalance counter weights must be fixed to at least reduce the registered and calculated imbalance.

FIG. 3 illustrates a principle for static wheel balancing according to the invention, in which the weight of the wheel WH is measured at a predetermined distances PD1 and PD2 from the weight measuring point WMP to at least one of the said at least two wheel support elements WSE.

The present wheel is shown with a tire TIR mounted on a wheel rim WHR, here shown as a wheel edge WE which may be close to the wheel rim WHR, even including part of the tire TIR or including the wheel rim WHR itself.

Different angular positions APn are shown at the wheel edge, here the wheel rim WHR, and the angular positions are all associated with a corresponding angular orientation AO. The illustrated angular position AP2 is here defined by the specified angular orientation AO and the wheel edge WE.

The center of the wheel is shown as a hub having a bore center axis HBCA and a hub bore edge HBE.

An imbalance counterweight CW is shown as fixed to the wheel at corresponding angular position CAP.

FIG. 4 illustrates a principle for static wheel balancing within the scope of the invention, in which partial weight measurements of at wheel is obtained at a weight measuring point WMP at a fixed predetermined distances PD1 and PD2 to wheel support elements WSE using a WSE element as a measurement point WMP in the form of a fixed carrier FIC to keep the weight measuring point at a fixed predetermined distance from the other non-measuring wheel support element(s). Thus, it is within the scope of the invention to measure the partial weight of a wheel at various angular orientation AO, keeping the predetermined distances PD1 and PD2 constant across the angular orientations AO at which the partial weight of the wheel WH is measured. The weight measurements are thus not following the wheel rim WHR but a perfect circle in the wheel positioning plane WPP. The wheel rim WHR has a distance to the hub bore center axis HBCA and the distance is shown as a runout distance ROD. In practice, variations in the distance related to the hub bore center axis may often be of interest for calculation of corrections for imbalances.

FIGS. 4a and 4b shows a principle of two different wheel support elements WSE applicable for carrying a weight measuring points WMP within the scope of the invention.

FIG. 4a shows wheel support element WSE with a weight measuring arrangement comprising a fixed carrier FIC with a pointy edge. The pointy edge of the fixed carrier has the benefit that it may keep contact with the wheel rim even if the contact point varies due to an imperfect wheel rim WHR.

Figure 1A:
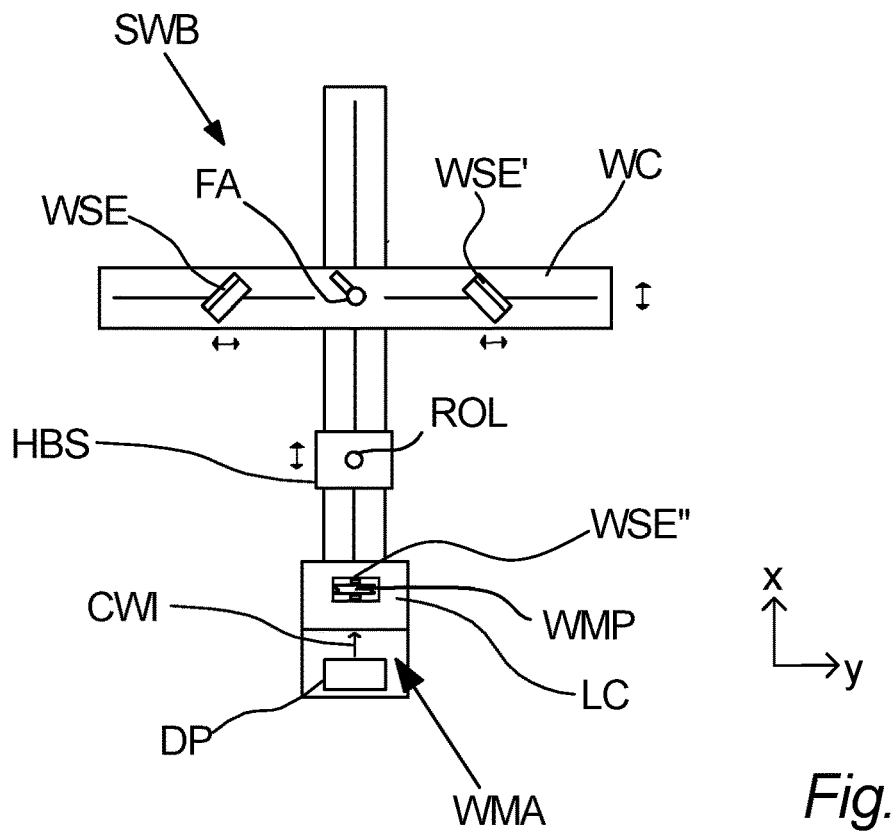

In FIG. 4b a variation of a wheel support element WSE comprising a fixed carrier FIC with a rounded edge is shown. The rounded edge of this particular fixed carrier has the benefit that a partial weight of a wheel may be measured at the tire TIR without damaging the tire.

FIG. 5 illustrates a principle for static wheel balancing according to the invention, at which the partial weight of a wheel is measured at predetermined distances PD1, PD2 that are allowed to vary across angular positions AP. This is referred to as a floating weight measurement. Variations in the predetermined distances PD1, PD2 are facilitated by allowing the weight measuring point WMP to vary with variations in the wheel shape, when the wheel WH is positioned in the static wheel balancer. In this context, the weight measuring point is forced to follow the imperfect wheel rim WHR across angular positions by mechanical design of the wheel support element including the weight measuring point WMP.

FIG. 5a shows a principle for static wheel balancing within the scope of the invention that includes a wheel support element WSE with a weight measuring arrangement WMA, comprising a floating carrier FLC. In an advantageous embodiment of the invention, the floating carrier may comprise a bearing with a special fitted designed groove. This has the benefit that the floating carrier may be kept fixated at the edge of the wheel rim WHR, thereby allowing the position of the floating carrier to vary with the position of the edge of the wheel rim. It is within the scope of the invention to fixate a floating carrier to other positions of the wheel, such as for example, the edge of the wheel rim that is positioned more far away from the center of the wheel.

FIG. 5b shows a principle for static wheel balancing within the scope of the invention, wherein the weight measuring arrangement WMA comprises a floating carrier FLC, which include a positioning detection arrangement PDA2 using a micrometer or another means of accurate measure, mentioned earlier in the description. In a preferred embodiment of the invention, the positioning detection arrangement is configured to measure variations in the position of the floating carrier or variations in the relative distance that the floating carrier moves across the angular positions at which a partial weight of a wheel is measured, when the wheel is positioned in the static wheel balancer. Furthermore, it is within the scope of the invention to measure the position of the floating carrier or the weigh measuring point, with respect to at least one of the at least two wheel support elements. In an advantageous embodiment of the invention, the variation in position of the wheel carrier or variations in the relative distance the wheel carrier moves across angular positions at which a weight is measured is utilized to characterize runout of a wheel. Notice that it is within the scope of the invention to apply further measurements to characterize runout of a wheel.

When determining and subsequently reducing the static imbalance of a wheel, it may further be an advantage to adjust the weight measurement according to variation in wheel shape parameters. Variations in wheel shape parameters may for example include variations in wheel WH diameter and/or wheel radius across angular positions AP.

Such variation may be characterized as runout of the wheel. Thus, it is within the scope of the invention, to determine the runout of a wheel, and further to adjust obtained imbalance weight measurements of the wheel according to the determined runout of the wheel WH. In the present context, runout refers to deviations in the wheel-shape from a perfect circular shape as exemplified in FIG. 4 and FIG. 5. It is within the scope of the invention to characterize runout as a variation in runout distance ROD, while at the same time doing a partial weight measurement. In principle, runout distance refers to the wheel WH radius as measured from the hub bore center axis HBCA to the outer edge of the wheel rim of the wheel WH. The runout distance ROD of a wheel WH may be measured at any angular positions APn at which a weight is measured. Variations in runout distance may also be derived in several different ways, using either weight measurements or variations in other measurements relating to wheel shape.

An observation when calculating the imbalance weight is that the geometrical center of the wheel may show a displacement in the first, second and third direction, as shown in FIGS. 4 and 5. This center displacement together with the runout can be calculated and corrected.

Directly Measure Runout

It is possible to measure or derive variations in the runout distance across the angular position APn for which a partial weight of a wheel is obtained. In an embodiment of the invention, this is achieved by obtaining floating weight measurements including corresponding information on the position of the floating carrier relative to the position of the hub bore center axis, the position of which is determined with a hub bore structure FIBS or a wheel center axle, configured to measure approximate variations in the position of the hub bore center axis HBCA, hub bore edge HBE or wheel center axis. It is possible that the variation in the position of the hub bore center axis HBCA is approximated by measuring variations in the position of the hub bore edge HBE. Several other ways of measuring runout directly may be applied within the scope of the invention, while also obtaining the partial weight of the wheel at the angular position It is noticeable, that this does not have to be obtained simultaneous.

Indirectly Measure Runout

It is also possible to derive variations in the runout distance by measuring variations in the position of the floating wheel carrier relative to at least one of the at least two wheel support elements, while at the same time or subsequently obtaining a measure of the runout. This may e.g. be obtained through a hub bore structure HBS configured to measure approximate variations in the position of the hub bore center axis HBCA relative to the at least one of the at least two wheel support elements. Using the aforementioned information, it is possible to mathematically derive variations in the runout distance and further to adjust the obtained imbalance weight measurements accordingly.

It is possible to approximate the runout of a wheel by means of partial weight measurements of the wheel. Thus, in one principle within the scope of the invention, a set of partial weight measurement of the wheel is obtained, such that for a number given angular positions APn, the partial weight of the wheel WH is measured both at a fixed predetermined distance PD ($m_i$), while at the same angular position APn, the partial weight of the wheel is measured at a variable predetermined distance PD ($m_f$). This corresponds to obtaining both a fixed weight measurement and a floating weight measurement at a given angular position AP. According to for example equation 2, the runout distance at a given angular position ($\theta$) may then be characterized by utilizing that the difference in weight between the two weight measurement $\theta m_\theta$ as a dependent function of the runout distance $ROD_\theta$.

$$\Delta m_\theta = m_{\theta i} - m_{\theta f} \qquad \text{Equation 1}$$

$$ROD_\theta = f(\Delta m_\theta) \qquad \text{Equation 2}$$

The average runout of a wheel across the measured angular orientations AO can be expressed as:

$$\overline{ROD} = \overline{f(\Delta m_\theta)} = \sum_{\theta=1}^{\theta M} \frac{ROD_\theta}{\theta M}, \qquad \text{Equation 3}$$

where $\theta M$ is the number of measured angular orientations.

Then an adjusted runout at a given angular orientation may be calculated as:

$$\overline{ROD_\theta} = ROD_\theta - \overline{ROD} \qquad \text{Equation 4}$$

The average measured weight at the given angular orientation can then be determined as:

$$m_\theta = \frac{m_{\theta i} + m_{\theta f}}{2} \qquad \text{Equation 5}$$

The weight at the given angular orientation is then adjusted by the contribution of weight displacement from the runout $ROD_\theta$:

$$\overline{m_\theta} = m_\theta - f^{-1}(\overline{ROD_\theta}) \qquad \text{Equation 6}$$

The adjusted weight measurements may then be applied to calculate the counterweight CW required to reduce the static imbalance of the wheel WH:

$$m_{\theta b} = MAX \overline{m_\theta} - MIN \overline{m_\theta} \text{ at } \theta \qquad \text{Equation 7}$$

Notice that the MAX $\overline{m_\theta}$ will occur at 180 degrees opposite to the MIN $\overline{m_\theta}$. or a distributed minimum at more orientation angles, indicating more imbalance counter weight shall be mounted, at multiple angular positions APn.

The above described method, in which runout is characterized using weight measurements, may work for static wheel balancing of most wheels, with the benefit that only partial weight measurements of the wheel is required to determine the static imbalance of a wheel, including adjustment for runout of the wheel. The method may be particularly useful in situations where the runout is small but cannot be disregarded.

Figure 6A:
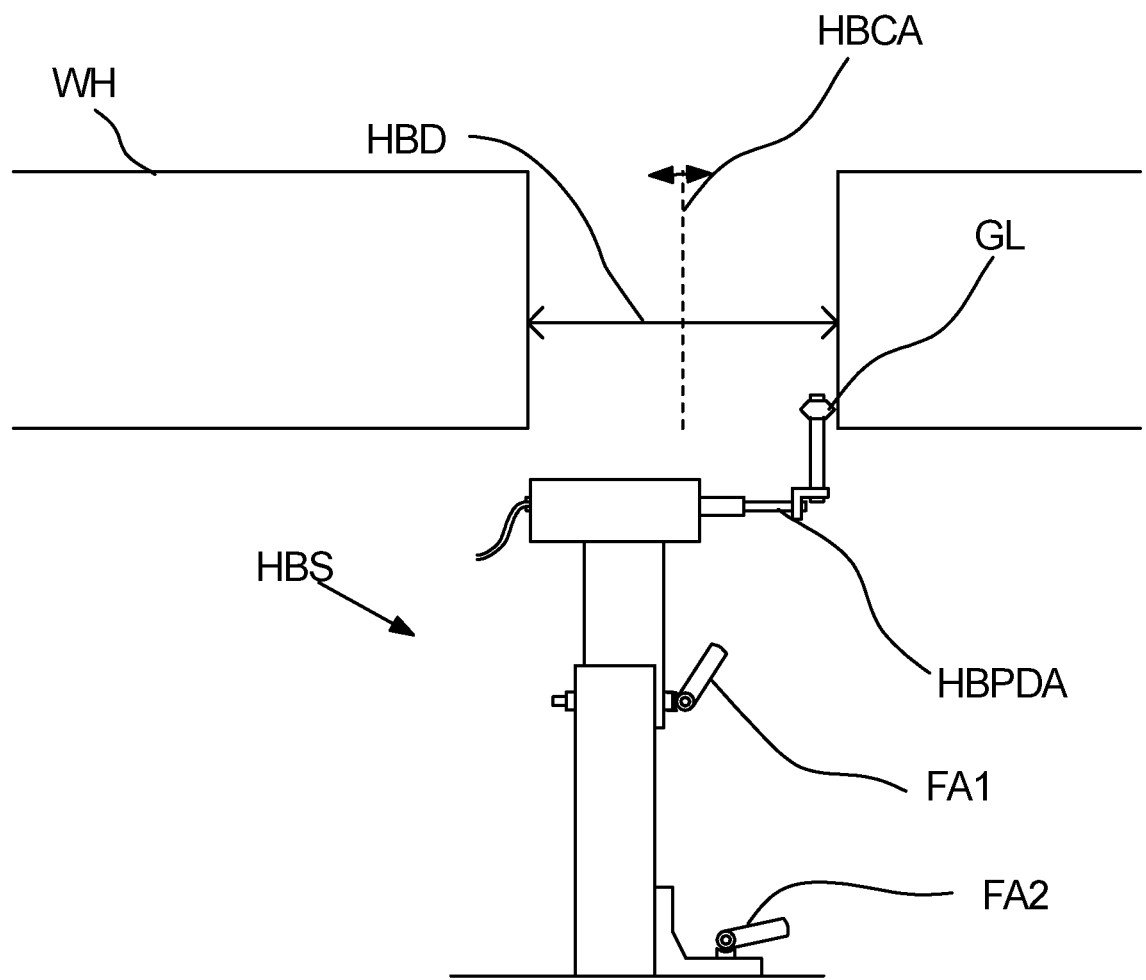

Notice that regardless of which of the previously described embodiments of the invention that is utilized to determine the runout distance of a wheel and the corresponding obtained partial weight measurements of the wheel, it is within the scope of the invention to adjust the weight measurements according to the principle of equation 6. Furthermore, it is within the scope of the invention to apply partial weight measurements of a wheel, adjusted for runout or not, and apply the weight measurements to derive the imbalance counterweight and the corresponding position of the counterweight required to reduce the static imbalance of a wheel, according to the principle outlined in the above equations FIG. 6a illustrates a feature which may be included in an apparatus according to e.g. FIG. 1 or FIG. 2, where runout is to be measured and corrected for in the calculations of imbalance and/or reduction/compensation thereof. The present illustrated feature measures a floating measurement as illustrated in FIG. 5 illustrated in 8b, where variation or a derivative thereof is measured during or after a fixed measured weight measurement according to e.g. FIG. 8a.

In the present embodiment a wheel WH (partly shown) having a hub bore diameter HBD and a hub center axis BHCA is positioned in a static wheel balancer (not shown in its entirety) The static wheel balancer includes a hub bore structure FIBS including a hub bore position detection arrangement HBPDA. In the present the terminology hub bore structure may be somewhat misleading, but the structure basically serves as fixed anchoring for the hub bore position detection arrangement HBPDA. The hub bore position detection arrangement HBPDA includes a roll ROL. The roll could also be implemented as a rotor. The rolls follow the inner surface of the hub bore during measurements at different angular orientations and a deviation in the measure may be applied to derive the position of the hub bore center axis HBCA. The position of the hub bore center axis HBCA in the present context is an approximation derived from the assumption that the hub bore is essentially circular. The registered position of the hub bore center axis HBCA may be used in conjunction with a corresponding floating position measure of the wheel rim to determine the runout at each angular position.

In the illustrated embodiment, the hub bore structures FIBS is arranged with two adjustable fasteners FA1, FA2, by means of which the hub bore detection arrangement HBDA may be adjusted in the lateral and horizonal and direction, respectively, in order to fit the particular size and geometrical structure of the wheel to be measured. In this way, the hob bore structure HBS may be applied for measured of different types and sizes of the wheel.

Figure 6B:
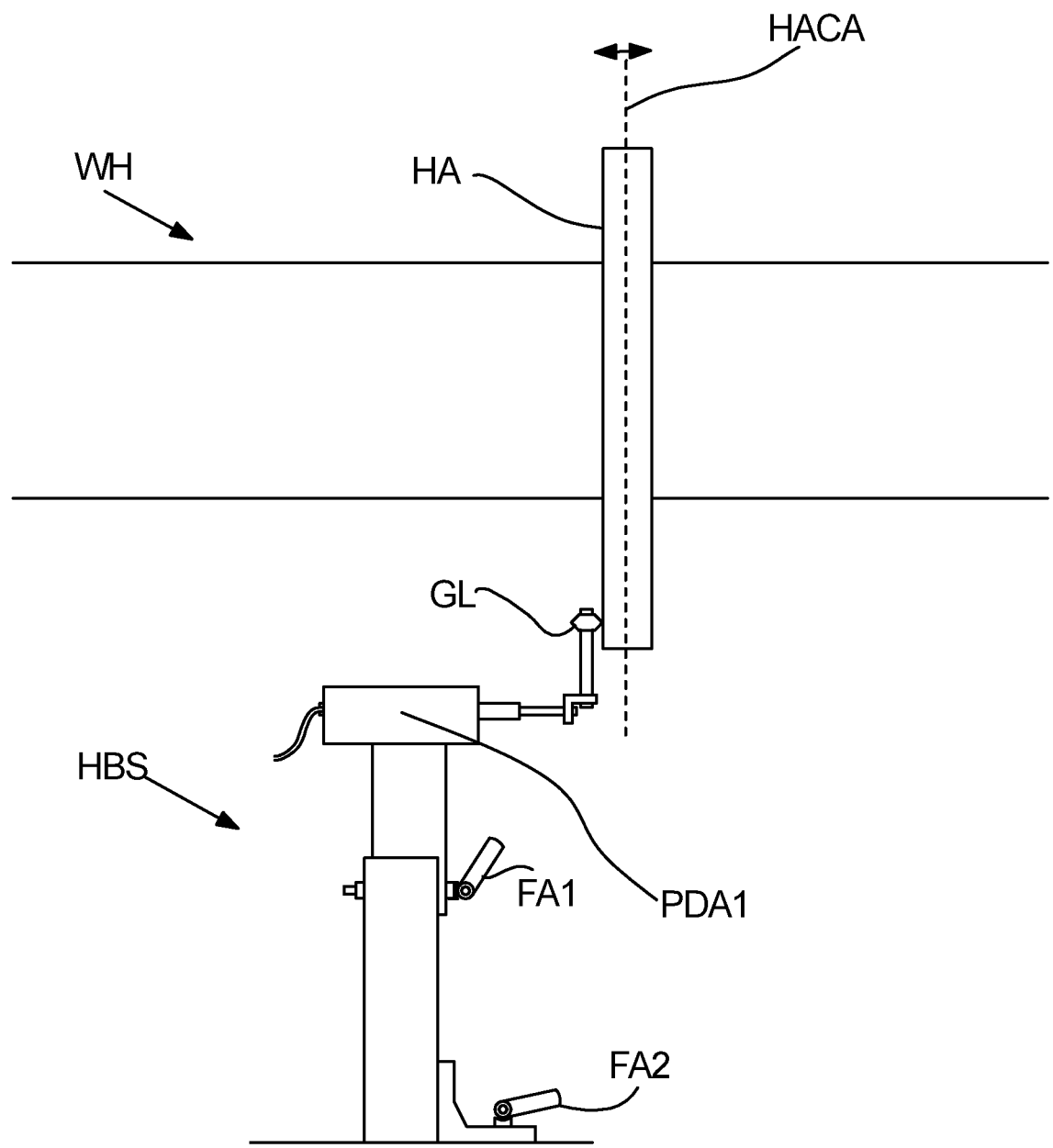

FIG. 6b illustrates another configuration of the hub bore structure HBS. In the configuration a wheel WH, e.g. a bike wheel, including a hub axle has been positioned in the wheel balancer. In this use of the wheel balancer the hub bore structure has been adjusted in position relative to the hub axle HA of the wheel by means of adjustable fasteners FA1, FA2 so that the roll ROL is now engaging the outside of the axel of the wheel in order to obtain a measure for the runout of the wheel directly on the basis of the relative movement in the horizontal direction of the hub axle or in order to obtain a measure which may be converted by calculation into the desired measure for runout.

Figure 1B:
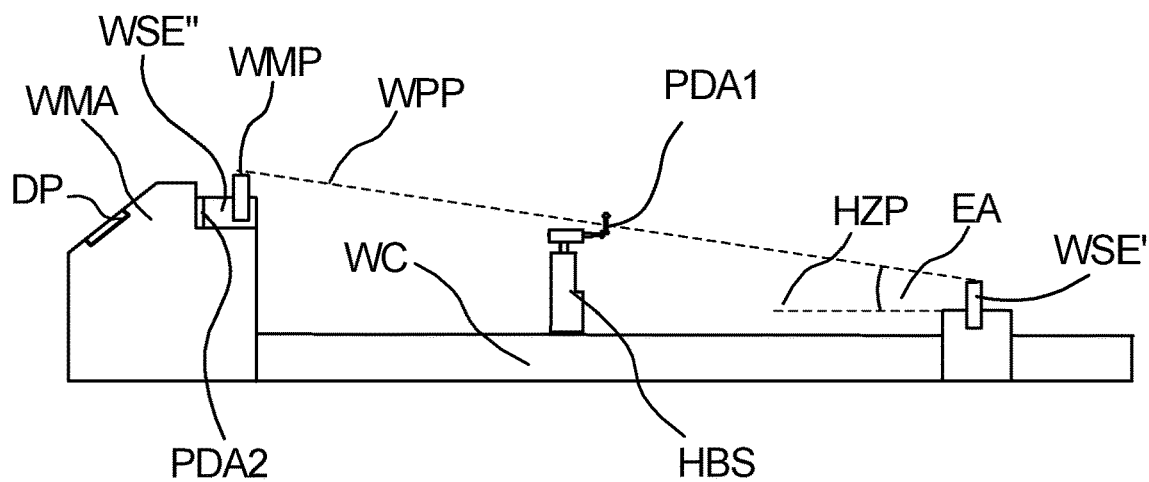
Figure 2:
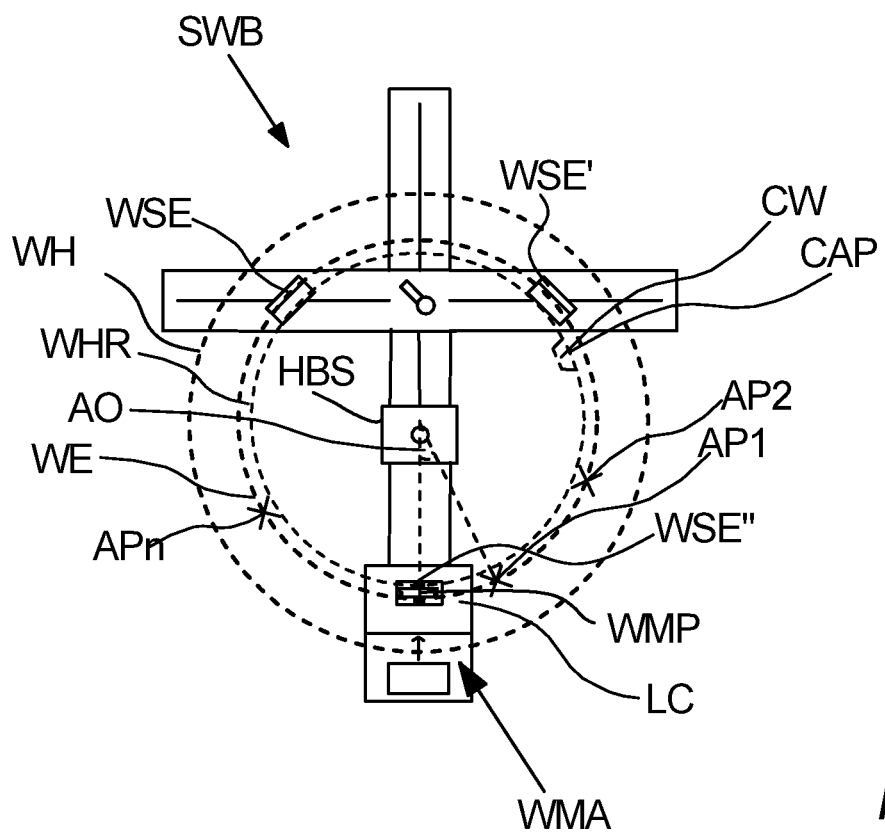
Figure 3:
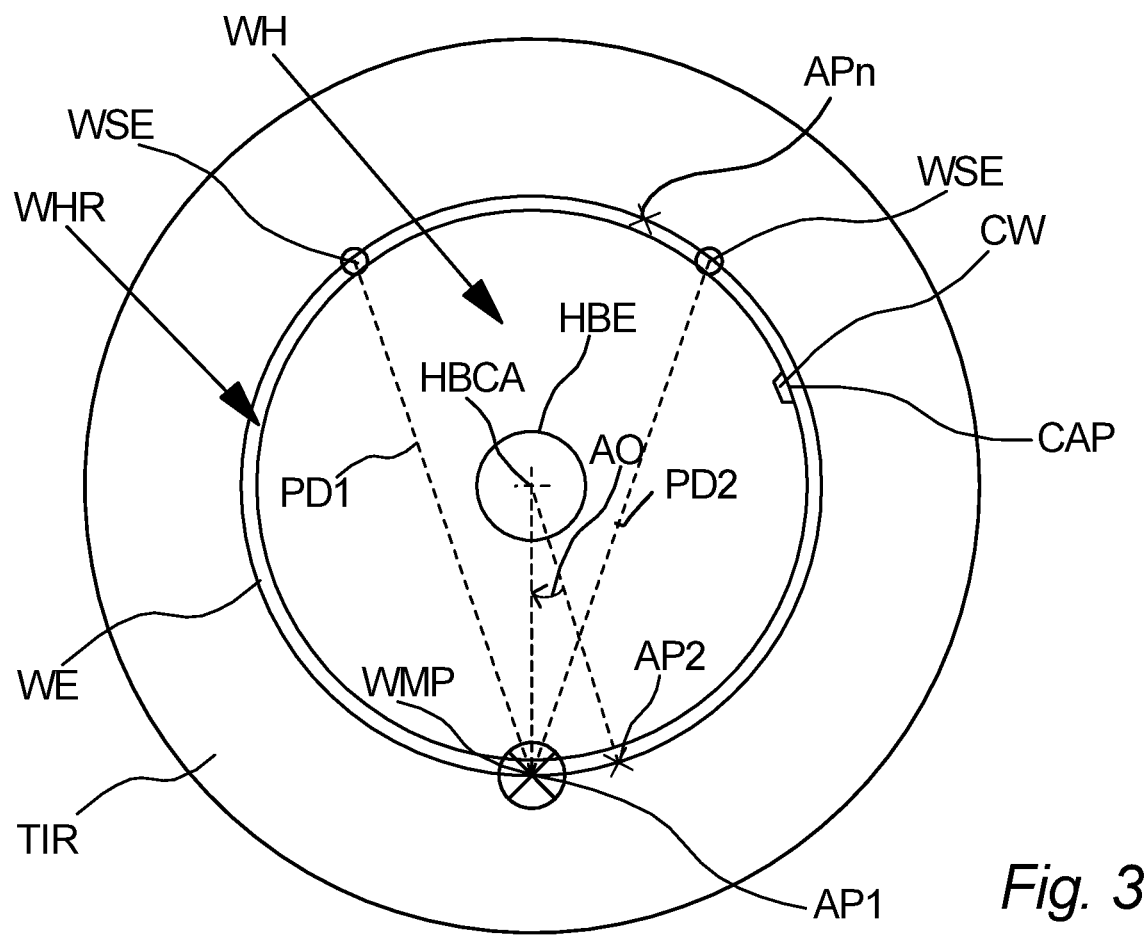
Figure 7:
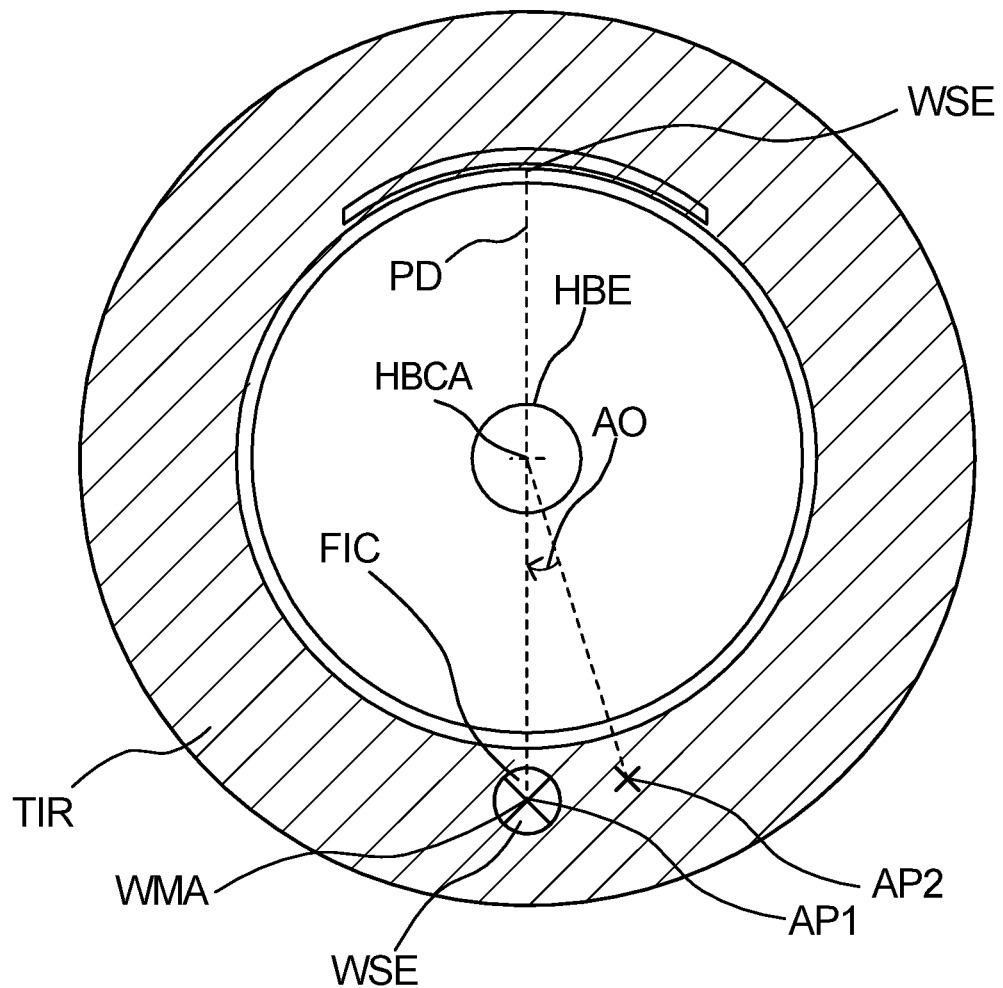

FIG. 7 illustrates a top view of an embodiment of the invention which is a variation of the embodiment of FIG. 1 or 3 now including only two wheel support elements WSE. The wheel support elements WSE must be designed to prevent a wheel from tilting when undergoing weight measurements across multiple angular positions APn.

A further feature, which may also be adapted in other embodiments independent on the number of wheel support elements applied, is that the weight measuring point WMP is designed to engage and measure weight at the tire TIR as indicated by the drawing. The weight measuring point is here carried by a fixed carrier FIC ensuring a fixed predetermined distance during measurements.

FIG. 8a-8d illustrate two different principles which may be applied within the scope of the invention for the purpose of determining and correcting for runout in relation to measuring and reducing imbalances of a wheel.

Figure 8A:
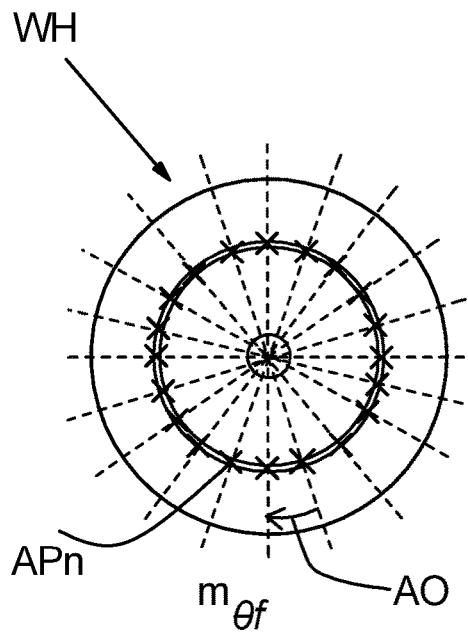

FIG. 8a illustrates that floating measurement $m_{\theta f}$ of partial weight of the wheel are made in a number of points APn in a floating distance to the center of the wheel. In the present embodiment the number of floating measurements $m_f$ are twenty and the angular distance AO between these points are chosen to make equidistant partial weight measurement of the wheel. As mentioned, the weight measures are obtained substantially in the wheel positioning plane and all with a floating distance to the opposite wheel support element(s). In the illustrated part of the measurement, partial weight measurement is measured as $m_{\theta f}$ as a function of the respective angular orientation AO.

Figure 8B:
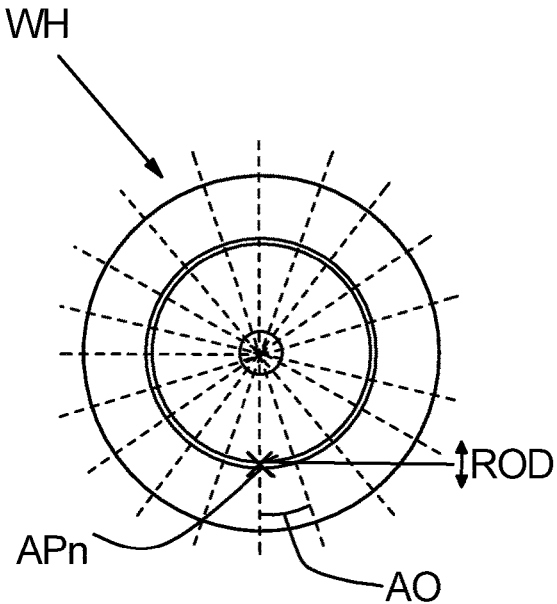

FIG. 8b illustrates a further measuring established for the purpose of taking runout into consideration. In the present context a further measure is made, namely the runout ROD represented as geometrical variation of the wheel in different respective angular orientations. The distance ROD is here measured at each angular position where the weight measures $m_{\theta f}$ of the first measurement was made/are made. Weight measures are thus made at a floating distance to the wheel center bore in FIG. 8a and the variation of the wheel rim is measured as runout ROD in FIG. 8b or a representation thereof. Together, the floating weight measurement of FIG. 8a and the floating distance measurement of FIG. 8b may be applied to calculate imbalance of the wheel and eventually reduce or compensate the imbalance, now corrected for runout. It should be noted that the runout measurement of FIG. 8b may be obtained in several different ways within the scope of the invention, e.g. by means of micrometer measurements or e.g. by optical measurements. Both floating distance measuring methods benefit from the fact that these may be obtained at the same time as the fixed distance weight measurement of FIG. 8a. In other words, the needed measurements may be obtained through only one rotation of the wheel and without requiring exchange of measuring equipment in order to obtain bot the fixed distance and floating distance measurements.

Figure 8C:
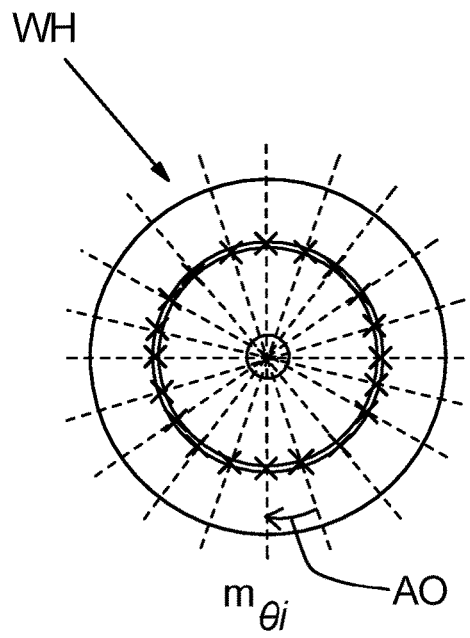

FIG. 8c illustrates that fixed measurement mj of partial weight are made in a number of points APn in a fixed distance to the center of the wheel. In the present embodiment the number of fixed measurements mj are twenty and the angular distance AO between these points are chosen to make equidistant partial weight measurement of the wheel. As mentioned, the weight measures are obtained substantially in the wheel positioning plane and all with a fixed distance to the opposite wheel support element(s). In the illustrated part of the measurement, partial weight measurement are measured as mei as a function of the respective angular orientation AO.

Figure 8D:
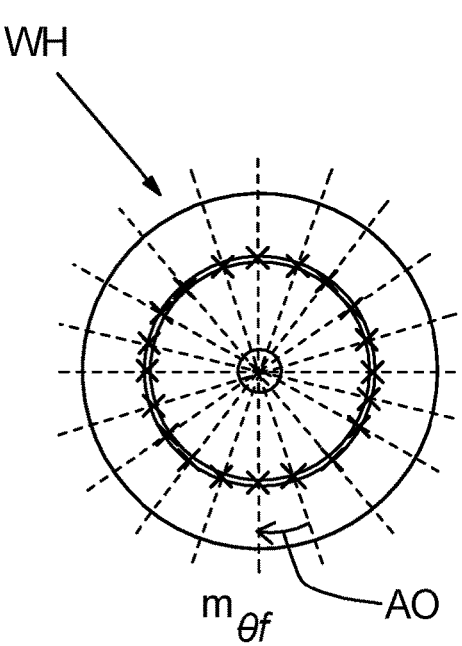

FIG. 8d illustrates a further measuring established for the purpose of taking runout into consideration. In the present context a further measure is made, a floating measuring of the weight variation of the wheel in different respective angular orientations. The runout may. The floating weight measures are in this illustration given as $m_{\theta f}$, i.e. weight measures obtained associated with respective angular orientation.

Further disclosure and explanation to the invention is given below.

An approach according to an embodiment of the invention is opposite of the known techniques to obtain the weight imbalance of a circle or other angle uniform geometry referenced in the prior art, as this invention uses the edge of the circumference (e.g. at Rim edge or other edge connection) as the reference for the weight imbalance measurement, rather than mounting the center of a circle on a turning or balancing vertical or horizontal hub. The center hub hole or mounting bracket in this invention is not needed and could even be not present, which is an advantage for this invention, as some circles (i.e. wheels does not have a hub hole, such mentioned example could be a bicycle wheel).

This invention has the advantage of measuring the imbalance of a circle without concerning the specific constructions at the centre mount.

Embodiments of the invention uses the principle of measuring the weights in as many points on the circumference as needed, as an example 36 equally spaced places on the circles circumference, with the same distance to the center of the circle, the same angle separation and the same height. Various types of scales can be used, old fashioned analogue scales based on balancing principle, spring force types or digital bar or ring types. The invention allows and is not limited to any specific type of scale where the resolution and linearity is 5-10 times smaller than the smallest imbalance weight expected compensated. By this, the Center of Gravity can be calculated for the physical moment forces expressed by the weight times the arm length from the center of gravity. This is known physical relations. So fundamentally imaging ex. 36 scales arranged equally around the circumference, which is horizontal positioned within few horizontal degrees, then the coming explanation of the invention will remain easier to understand.

Embodiments of the invention takes advantage of but is not limited to reducing the number of weights measuring point to 1 (could be 2-3 or more). This is done by changing the concept of the fundamental way of finding the CG by slow step orienting the circle instead of measuring at the large number of points on the circumference, only one scale at one place named weight measuring point WMP at a center line is needed on the circumference, however this requires more arrangements in the physical modelling and arrangement. Please observe that the wheel structure does not have any angle velocity. Optimal is that the circle is stationary with no velocity during the scale measurement or the rotational speed is so slow that the dynamic forces can be neglected.

A way of calculation the Center of Gravity is in the nature a 3-dimentional problem, where all weight vectors should be derived, however as the invention only relates to the static (radial) weight imbalance measurement. The direction in the lateral (along the rotational axis) direction is omitted in the rest of the explanations of the invention, as majority of circles (i.e. wheels) only needs a Radial imbalance compensation placed in the center of the lateral Center of Gravity point (i.e. in middle of the wheelrim lateral direction). This is known prior art and obtained similar in such inventions. This invention purpose is reduced to cover the same static imbalance problem only.

To reduce the potential calibration and errors that can be introduced by using more scales, the invention take advantage of reducing the Center of Gravity calculation and measurement to a one-dimensional problem in the x-direction, i.e. centerline by introducing instead of a scale, 2 equally carry positions, WSE and WSE' on the opposite side of the circumference to the weight measurement position from the center of the circle and placed around the center line, in principle the invention could have more than 2, but here illustrated with 2, as this is enough to keep balance in the y-direction. Now the invention carry the characteristics of having 1 scale at the weight measurement position at the center line on the circumference, and 2 wheel support elements at the somewhat same distance on the circumference from the circle center and somewhat same angle from the center line opposite the wheel measurement point. This will then allow the circle (i.e. wheel or other rotational angle uniform geometry) to balance on 3-points where of only one point will measure the weight. By geometrical transformations this can then reduce the two wheel support elements into an equivalent carry point on the center line, thus the Center of Gravity can be calculated as a one-dimensional problem on the center line. Recording the measurements for all rotations of the circle, will then yield the variation of the weight, alias the imbalance of the said angle uniform geometry.

The selection of only one weight measuring point WMP is not the only representative for the invention, as also 2 or even 3 or more scales/measuring points can be included giving other advantages or disadvantages, but for simplicity of the invention description only the example of the 1 scale embodiment has been shown here.

If high precision is required this will work mainly for a perfect circle geometry, where the distance to the circumference from center is always the radius R. Many circles (i.e. wheels) has such perfect construction, thus the invention will be able to calculate and measure the imbalance in most simple way of finding the variation and minimum and maximum of the weight for all orientation angles.

Many circumferences are not perfect and have what is called a runout that will become a problem when using the circumference as a measurement point, thus leading to wrong simple physical model and calculation. Some experts would then claim this is not possible, however by introducing one more technique the imperfections of the circumference resulting in a change in the radius at different orientation angles and thereby the Center of Gravity and center of the circle to move around can be compensated as long the runout is much smaller than the circle radius. For all circles used for high speed rotation, like ex. a wheel this is a necessity. Another unique feature of the invention that allows using the circumference as a point of reference for measuring the Center of Gravity is done by making the measurement of the weights at the weight measuring point with 2 different conditions. First a floating condition, where the Scale follows the circumference imperfection, while recording the weight measured and another measurement where the distance to the opposite wheel support elements WSE, WSE' is fixed thus allowing the wheel to move freely in and out on top of the scale.

It has been shown by physically models and mathematical calculations that the runout can be expressed as an algebra quadratic function of the difference between the floating measured value and the fixed measured value. Runout ROD=f($m_i$−$m_f$) allowing for obtaining the needed imbalance weight to allow for the constant rotational forces with a runout present. The invention can then measure the floating and the fixed weight difference and overcome that the circumference is not perfect under the condition that the runout is much smaller than the radius.

It has been derived by mathematical calculations that the center of the circle typically moves around very little due to the circumference imperfection, which will be normally a problem in an imbalance calculation, but as the measurement are done in a specific way two times, this will cause the principle of the invention to function by a runout compensation as well for most conditions of the same. Several other errors due to geometrical arrangements are introduced, such as center moving in the y-direction pushing the one-dimensional condition not true, variances in distances and angles of wheel support elements WSE and WSE', imbalance dependency of both the floating and fixed measurement technique, Effect of different runout located in wheel support element WSE and WSE', Effect of a shift of rotation angle, Having 2 runout points—opposite extreme calculations, moving the fixed position of weight measuring point slightly compared to the floating position of the same. With all these errors and uncertainties, it is for the practical embodiment of the invention acceptable to allow and control the sizes of the errors and uncertainties making the invention producible in a simple form, this has also been proven by established prototypes and tests.

Embodiments of the invention further introduces several important characteristics beside the fundamental operation.

Embodiments of the invention can be used without power, if a powerless scale is used and the moving of the circle (e.g. wheel) is done by hand or driven by simple power supply, even from a build-in battery, depending on the type of circle that needs balancing. The invention in not in any way limited by the choice of power supply and even a solar powered version would be possible.

Embodiments of the invention can also be driven by a motor to move the circle from angle point weight measurement to the next angle point weight measurement.

A custom or standard wheel support element for circumference connection (e.g. Rim attachment) for both the wheel support elements 1, 2, 3 up to N.

A custom or standard wheel support element for circumference connection (e.g. Rim attachment) for the weight measuring point which is different from the wheel support element WSE and WSE', up to a number N A unique selection of a combined wheel support element for weight measuring points that allows for both the floating and fixed measurement with one wheel support element only.

Making optimized customizable carriers easily exchanged and produced to fit the selected wheel type Using the invention fully manual, when the runouts are very small, then no complicated calculations are necessary, and the invention can be turned by hand only doing the floating condition weight measurement. This will fulfil some and often most requirements of the usage.

A method of calculation of the runout compensation and the imbalance weight calculation for both floating- and fixed-point weight measurement.

Where the runout weight variance will influence the imbalance weight calculations too much, this in when the circle (i.e. wheel) weight is large and the radius is small, a micrometer, which can be both an analog spring version or a digital version, is introduced and positioned at the center hub bore edge under floating measurement to measure the exact physical runout followed by a compensation calculation for the center of the circle position while calculating the imbalance compensation weight. This is another unique feature of the invention, for handling extreme runout conditions.

It is not beforehand the exact application is known (ex. car wheels, bus wheels, motorcycle wheels, bicycle wheels, flywheels) to identify the method of imbalance calculation and position, and it is an industrial application to offer different models of the suggested invention, such as:

A remarkably simple powerless model, turned by hand, where runout does not impact the imbalance calculations and only floating measurement with an analog scale principle applies A simple powerless model, turned by hand, where runout does only impact the imbalance calculations slightly and both a floating- and fixed-point weight measurement is made with an analog scale.

A simple powerless model, turned by hand, where the runout impacts the imbalance weight and an analog micrometer together with a floating-point weight measurement is made with an analog scale, and a calculation compensation scheme is given for the specific case of usage.

A power operated model (can be battery or mains supply), where runout does not impact the imbalance calculations and only floating measurement with a digital scale principle applies. The circle can be turned by hand or by a motor at scale 1 carrier.

A power operated model (can be battery or mains supply), where runout does only impact the imbalance calculations slightly and both a floating- and fixed-point weight measurement is made with a digital scale and the compensation is calculated in a microprocessor and the turn is motor operated. This model will automatically calculate the imbalance weight and position and turn the circle (i.e. wheel) to the desired position and announce the compensation weight.

A power operated model (can be battery or mains supply), where runout impact the imbalance calculations and a digital micrometer and a floating weight measurement is made with a digital scale and the compensation is calculated in a microprocessor and the turn of the circle is motor operated. This model will automatically calculate the imbalance weight and position and turn the circle (i.e. wheel) to the desired position and announce the compensation weight.

The above examples are not regarded as the only variants of the invention but are to be considered as illustrations of the many possible realizations of the invention.

The invention includes a method of calculating the sum of runouts for both the sides of the circumference imperfections and derive the runout size and position.

The invention also includes a connectivity to a computer to printout and calculate the imbalance for all angles and suggest optimal combination of imbalance weight compensation, not only limited to one position, but as multiple compensation weight placements.

LIST OF ABBREVIATIONS $\theta$ given angular position
AO angular orientation
AP angular points
APn successive angular points
CPU central processing unit
CAP corresponding angular positions
CWI counterweight indicator
CW counterweight
DP display
EA elevation angle
FA1 adjustable fastener
FA2 adjustable fastener
FIC fixed carrier
FLC floating carrier
FLCL floating carrier length
HZP horizontal plane
HBCA hub bore center axis
HBE hub bore edge
HBPDA hub bore position detection arrangement
HBS hub bore structure
LC load cell
M motor
N integer number
PD predetermined distance
PDA positioning detection arrangement
PDA2 second position detection arrangement
PDA1 first position detection arrangement
ROD runout distance
ROL rolling arrangement
SWB static wheel balancer
TIR tire
WC wheel carrier WE wheel edge
WH wheel
WMA weight measuring arrangement
WMP weight measuring point
WPP wheel positioning plane
WSE wheel support elements

The invention claimed is:

1. A static wheel balancer; comprising:
a wheel carrier;
  wherein the wheel carrier includes at least two wheel support elements;
    wherein the wheel support elements supports and establish a reference for a selected edge of a wheel when the wheel is positioned in the wheel carrier, wherein the wheel support elements defines a wheel positioning plane; and
the static wheel balancer further comprising a weight measuring arrangement including at least one load cell;
  wherein a weight measuring point of the load cell is arranged to measure a partial weight of the wheel at a selected wheel edge at a given angular orientation of the wheel; and
  wherein the weight measuring point is arranged at a predetermined distance to at least one of the at least two-wheel support elements; and
  wherein the weight measuring point forms part of one of the at least two wheel support elements; and
the static wheel balancer further including a display arranged to display a measure of imbalance obtained based on partial measured weight at the weight measuring point.

2. The static wheel balancer according to claim 1, wherein the weight measuring point is arranged at a predetermined distance to at least one of the at least two wheel support elements and wherein the predetermined distance varies with the position of the measuring point when the position of the measuring point is defined by the wheel edge when the wheel is repositioned or reoriented in the static wheel balancer.

3. The static wheel balancer according to claim 1, wherein the weight measuring arrangement comprises a rolling arrangement configured to enable reorientation rotation of a wheel relative to the weight measurement arrangement when the wheel is moved in the static wheel balancer.

4. The static wheel balancer according to claim 1, wherein the weight measuring arrangement comprises a floating carrier that is moveably arranged to facilitate measurement of a partial weight of the wheel at a weight measuring point at a variable distance to at least one of the at least two wheel support elements.

5. The static wheel balancer according to claim 1, wherein the wheel balancer comprises a runout measuring arrangement configured to measure runout of a wheel, when the wheel is positioned in the static wheel balancer.

6. The static wheel balancer according to claim 1, wherein the weight measuring arrangement comprises a positioning detection arrangement, configured to determine the position of the floating carrier weight measuring point when a partial weight of a wheel is measured.

7. The static wheel balancer according to claim 1, wherein the wheel comprises a hub bore edge and having a hub bore center axis and a center axis of the wheel, and wherein the static wheel balancer comprises a first detection arrangement configured to measure variations in the distance between the hub bore edge, the hub bore center axis and/or the center axis of the wheel and the weight measuring point of a wheel when the wheel is positioned in the static wheel balancer.

8. The static wheel balancer according to claim 1, wherein the wheel balancer is configured to enable angular orientation of the wheel carrier with respect to a wheel, when the wheel is positioned in the wheel carrier, thereby facilitating partial weight measuring of the wheel at various angular points on the wheel edge and wherein the wheel balancer is configured to automatically store and correlate such measured data to corresponding representations of angular orientation.

9. The static wheel balancer according to claim 1 comprising a motor configured to rotate a wheel under control of a central processing unit when the wheel is positioned in the static wheel balancer.

10. The static wheel balancer according to claim 1 comprising: a central processing unit configured to calculate the static imbalance of a wheel;
  wherein the central processing unit includes a processor; and
  a control unit; and
  an arithmetic logic unit; and
  memory; and
  a data input and a data output.

11. The static wheel balancer according to claim 1, wherein the balancer comprises a counterweight indicator configured to indicate the location to which weight should be added to a wheel in order to reduce static imbalance of the wheel.

* * * * *